(12) United States Patent
Onoue

(10) Patent No.: US 7,691,334 B2
(45) Date of Patent: Apr. 6, 2010

(54) TEMPERATURE CONTROL APPARATUS FOR MICROCHEMICAL CHIP

(75) Inventor: Katsuhiko Onoue, Hamamatsu (JP)

(73) Assignee: Yamaha Corporation, Shizuoka-Ken (JP)

(*) Notice: Subject to any disclaimer, the term of this patent is extended or adjusted under 35 U.S.C. 154(b) by 140 days.

(21) Appl. No.: 11/532,505

(22) Filed: Sep. 15, 2006

(65) Prior Publication Data
US 2007/0116614 A1    May 24, 2007

(30) Foreign Application Priority Data
Sep. 20, 2005    (JP)    ............ P2005-271781

(51) Int. Cl.
G05D 23/00    (2006.01)
B01J 19/00    (2006.01)
G05B 21/00    (2006.01)

(52) U.S. Cl. .................. 422/109; 422/198; 700/274

(58) Field of Classification Search .............. 422/109, 422/198; 700/274
See application file for complete search history.

(56) References Cited

U.S. PATENT DOCUMENTS

| 6,525,343 B1 | 2/2003 | Tanga |
| 2003/0057199 A1* | 3/2003 | Villa et al. ............... 219/521 |
| 2005/0006372 A1* | 1/2005 | Murakami et al. ......... 219/385 |

FOREIGN PATENT DOCUMENTS

| JP | 2005-114298 A | 4/2005 |
| WO | WO 00/48724 | 8/2000 |

* cited by examiner

Primary Examiner—Walter D Griffin
Assistant Examiner—Lessanework Seifu
(74) Attorney, Agent, or Firm—Dickstein Shapiro LLP

(57) ABSTRACT

A temperature control apparatus for a microchemical chip having at least one chemical reactor includes a temperature regulator, and a controller. The temperature regulator can advantageously be configured to allow the microchemical chip to be mounted thereon. The temperature regulator can advantageously be configured to be thermally engaged with the at least one chemical reactor so as to control the temperature of the at least one chemical reactor. The controller can advantageously be removably connected to the temperature regulator. The controller can advantageously be configured to control the temperature regulator.

31 Claims, 19 Drawing Sheets

TEMPERATURE CONTROL APPARATUS FOR MICROCHEMICAL CHIP

BACKGROUND OF INVENTION

1. Field of the Invention

The present invention generally relates to a temperature control apparatus for a microchemical chip. More specifically, the present invention relates to a temperature control apparatus for controlling a temperature of a chemical reactor included in a microchemical chip Priority is claimed on Japanese Patent Application No. 2005-271781, filed Sep. 20, 2005, the contents of which are incorporated herein by reference.

2. Description of the Related Art

All patents, patent applications, patent publications, scientific articles, and the like, which will hereinafter be cited or identified in the present application, will hereby be incorporated by reference in their entirety in order to describe more filly the state of the art to which the present invention pertains.

In recent years, a miniaturized chemical reaction system, so called microchemical system has been developed. The microchemical system is configured to make a chemical reaction, a biochemical reaction, and a sample analysis in a micro area by using MEMS (Micro Electro Mechanical System). The microchemical system utilizes a microchemical chip to make a reaction and an analysis. Typically, the microchemical system may include a substrate and at least one chemical reactor over the substrate. The substrate may be made of a glass, quartz, or a plastic material. The microchemical chip can advantageously be miniaturized to increase a reaction surface area per unit area of a sample. Increasing the reaction surface area can decrease a reaction time. Further, the microchemical chip can advantageously be configured to precisely control a flow rate of a sample so as to efficiently make a reaction and an analysis. Furthermore, the microchemical chip can advantageously be configured to reduce the necessary amount of sample or reagent.

The microchemical chip includes the chemical reactor over or in the chip. In the chemical reactor, a chemical process is caused. Typical examples of the chemical process may include, but are not limited to, mixture, reaction, extraction, separation, and condensation An optimum temperature control to the chemical reactor can be effective to increase the reaction rate, stabilize the reaction, activate the reaction, and increase the chemical performance.

International Publication No. WO00/48724 Pamphlet discloses a conventional technique for temperature control of the microchemical chip. The microchemical chip includes a chemical reactor and a thermoelectric device that is attached to a bottom of the chemical reactor. The thermoelectric device is configured to control the temperature of the chemical reactor, for example, heating and cooling the chemical reactor, thereby controlling a chemical reaction in the chemical reactor. A thermoelectric device is attached or fixed to the microchemical chip at a predetermined position thereof so as to efficiently control the temperature of a chemical reactor at a position over the microchemical chip. This thermoelectric device can not control efficiently the temperature of another chemical reactor at a different position from the above position. In order to efficiently control the other chemical reactor, it is necessary that the thermoelectric device is removed and reattached at a different position from the above-position. In other words, the best or better position of the thermoelectric device depends on the position of the chemical reactor. This means that changing the position of the chemical reactor needs changing the connection position or structure of the thermoelectric device. The conventional temperature control apparatus is not configured to allow user to change or adjust the position of the thermoelectric device in accordance with the position of the chemical reactor of the microchemical chip.

Japanese Unexamined Patent Application, First Publication, No. 2005-114298 discloses another conventional temperature control apparatus for microchemical chip. The other conventional temperature control apparatus is configured to allow user to change or adjust the position of the thermoelectric device in accordance with the position of the chemical reactor of the microchemical chip. The other conventional temperature control apparatus includes a temperature regulator, a temperature controller, a heat exchanger, and a moving and fixing device. The temperature regulator further includes a thermoelectric device and a temperature sensor. The temperature controller is configured to control a current flow to the thermoelectric device as to as control a temperature of one end of the temperature regulator, wherein the control is made with reference to the temperature measured by the temperature sensor. The moving and fixing device is configured to thermally connect or engage the heat exchanger with the opposite end of the temperature regulator. The moving and fixing device is configured to move and fix the temperature regulator relative to the heat exchanger.

The moving and fixing device is configured to allow user to move and fix the temperature regulator by adjusting a nut or a fixing screw. This means that user is allowed to freely change the temperature regulating position over the temperature control apparatus. The above configuration allows user to be free to select a position of the temperature regulator based on various temperature regulating positions of a temperature-regulating-object such as the microchemical chip. The above configuration allows a single temperature regulator to be used for various temperature regulating positions. The other conventional temperature control apparatus has a high flexibility of placement The other conventional temperature control apparatus is advantageous in cost reduction.

As described above, the other conventional temperature control apparatus is configured to allow user to adjust the nut or fixing screw in order to move and fix the temperature regulator in accordance with the type of the microchemical chip. This conventional configuration is disadvantageous in working efficiency and in time-consumption.

In view of the above, it will be apparent to those skilled in the art from this disclosure that there exists a need for an improved temperature control apparatus for a microchemical chip having at least one chemical reactor. This invention addresses this need in the art as well as other needs, which will become apparent to those skilled in the art from this disclosure.

SUMMARY OF THE INVENTION

Accordingly, it is a primary object of the present invention to provide a temperature control apparatus for a microchemical chip having at least one chemical reactor.

In accordance with a first aspect of the present invention, a temperature control apparatus for a microchemical chip having at least one chemical reactor may include, but is not limited to, a first temperature regulator, and a controller. The first temperature regulator can advantageously be configured to allow the microchemical chip to be mounted thereon. The first temperature regulator can advantageously be configured to be thermally engaged with the at least one chemical reactor so as to control the temperature of the at least one chemical reactor. The controller can advantageously be configured to control the first temperature regulator. The first temperature regulator and the controller can advantageously be connected removably to each other.

Preferably, the first temperature regulator may further include a first connector, and the controller may further include a second connector. The first and second connectors can be configured to be removably and electrically connected to each other.

Preferably, the first temperature regulator can advantageously include a first temperature control device disposed corresponding to each of the chemical reactors. The first temperature control device can advantageously be configured to be adjacent to the microchemical chip. The first temperature control device can be electrically connected to the first connector.

Preferably, the temperature control may further include a first heat conductor disposed on the first temperature control device. The first heat conductor can advantageously be configured to be adjacent to the microchemical chip.

Preferably, the temperature control may further include a first temperature sensor disposed in the first heat conductor. The first temperature sensor can advantageously be configured to sense the temperature of the first temperature control device. The first temperature sensor can electrically be connected to the first connector.

Preferably, the first temperature regulator may further include a supporter that has a thermal conductivity. The supporter can advantageously be configured to allow the first temperature control device and the first connector to be disposed thereon.

Preferably, the supporter may include a first heat radiator mechanism configured to perform a heat radiation from the supporter.

Preferably, the first heat radiator mechanism may further include a first plurality of radiator fins.

Preferably, the supporter may include an integration of a board and the first plurality of radiator fins.

Preferably, the temperature control apparatus may further include a cooling mechanism configured to cool the first temperature regulator.

Preferably, the cooling mechanism may further include an electric fan.

Preferably, the cooling mechanism may further include a water-cooler system.

Preferably, the temperature control apparatus may further include a positioning guide configured to guide the positioning of the microchemical chip relative to the first temperature regulator.

Preferably, the temperature control apparatus may further include a force-applying device configured to apply a force to the microchemical chip so that the microchemical chip makes contact with the first temperature regulator. The force-applying device may include a pressing device configured to press the microchemical chip against the first temperature regulator so that the microchemical chip makes contact with the first temperature regulator. The pressing device may include a cover member configured to cover the first temperature regulator, and the cover member is configured to contact with the microchemical chip to press the microchemical chip against the first temperature regulator. The force-applying device may also include a suction device configured to suck the microchemical chip so that the microchemical chip makes contact with the first temperature regulator.

Preferably, the temperature control may further include a pressing member configured to press the microchemical chip against the first temperature control device so that the microchemical chip makes contact with the first temperature control device. The pressing member can prevent the microchemical chip from receiving any damages.

Preferably, the pressing member may include a cover member configured to cover the first temperature regulator. The cover member can be configured to contact with the microchemical chip to press the microchemical chip against the first temperature regulator.

Preferably, the at least one chemical reactor may include a plurality of chemical reactors. The first temperature control device may further include a plurality of thermoelectric modules that are disposed corresponding to the plurality of chemical reactors.

Preferably, the at least one chemical reactor may further include a plurality of chemical reactors. The first temperature control device may further include at least one heater disposed corresponding to at least one of the plurality of chemical reactors, and at least one thermoelectric module disposed corresponding to the remainder of the plurality of chemical reactors.

Preferably, the controller may further include a control circuit configured to apply a current to the first temperature regulator through the first and second connectors.

Preferably, the temperature control apparatus may further include a cover member configured to cover the first temperature regulator. The cover member may include a pressing member configured to press the microchemical chip against the first temperature control device so that the microchemical chip makes contact with the first temperature control device. The pressing member can prevent the microchemical chip from receiving any damages. The pressing member can prevent the height of the microchemical chip from being deviated from a target height that has previously been given. This configuration can improve the accuracy of temperature control by the temperature control apparatus.

Preferably, the pressing member may include a projecting member containing an elastic material. The projecting member can be provided on an inner wall of the cover member.

Preferably, the temperature control apparatus may further include a casing that contains the first temperature regulator and the controller.

Preferably, the temperature control may further include a first casing that contains the first temperature regulator. The first casing is separate from the controller, thereby allowing the second casing to be reduced in size, and also increasing the flexibility of the placement of the controller relative to the first temperature regulator.

Preferably, the temperature control apparatus may further include a cover member configured to cover the first temperature regulator. The cover member may include a second temperature regulator adjacent to the microchemical chip. The second temperature regulator can advantageously be configured to be thermally engaged with the at least one chemical reactor so as to control the temperature of the at least one chemical reactor in cooperation with the first temperature regulator. The second temperature regulator can be removably connected to the controller. The microchemical chip is subjected to temperature controls by the first and second temperature regulators, thereby improving the accuracy of the temperature control.

Preferably, the second temperature regulator can further include a third connector. The controller can further include a fourth connector. The third and fourth connectors can be configured to be removably and electrically connected to each other.

Preferably, the second temperature regulator can advantageously include a second temperature control device disposed corresponding to each of the chemical reactors. The second temperature control device can be configured to be adjacent to the microchemical chip. The second temperature control device can electrically be connected to the third connector.

Preferably, the temperature control apparatus may further include a second heat conductor disposed on the second temperature control device. The second heat conductor can advantageously be configured to be adjacent to the microchemical chip.

Preferably, the temperature control apparatus may further include a second temperature sensor disposed in the second heat conductor. The second temperature sensor can advantageously be configured to sense the temperature of the second temperature control device. The second temperature sensor can electrically be connected to the third connector.

Preferably, the cover member can further include a second heat radiator mechanism configured to perform a heat radiation from the cover member.

Preferably, the second beat radiator mechanism may further include a second plurality of radiator fins.

Preferably, the temperature control apparatus may further include a second positioning guide configured to guide the positioning of the microchemical chip relative to the second temperature regulator.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
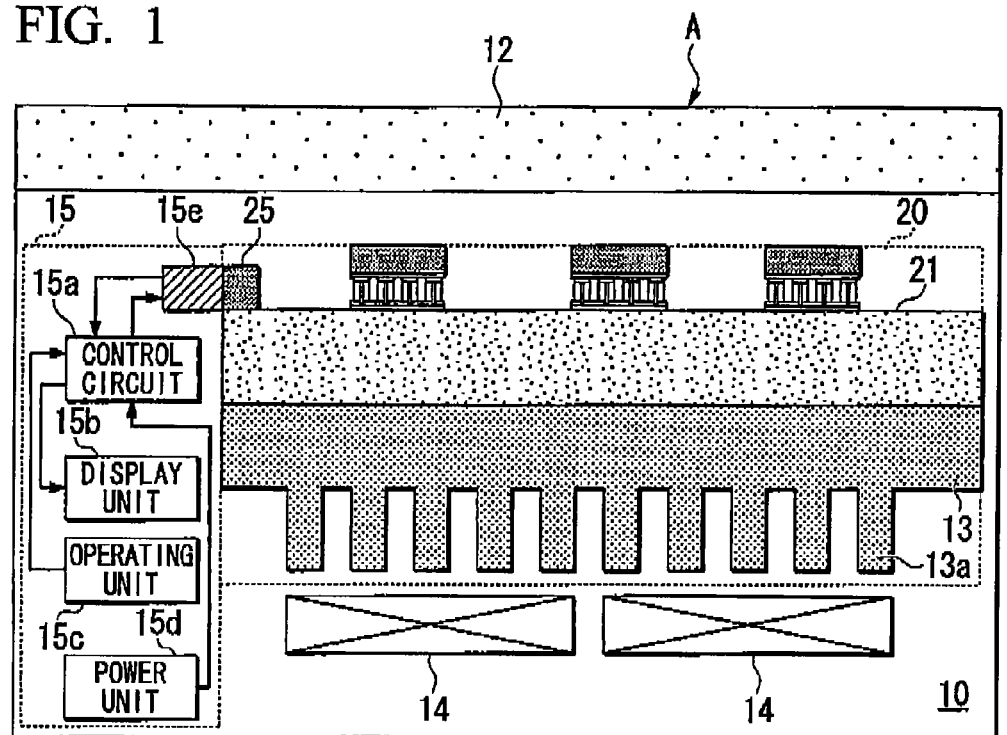
FIG. 1 is a schematic view illustrating a temperature control apparatus suitable for a microchemical chip in accordance with a first embodiment of the present invention.
Figure 2:
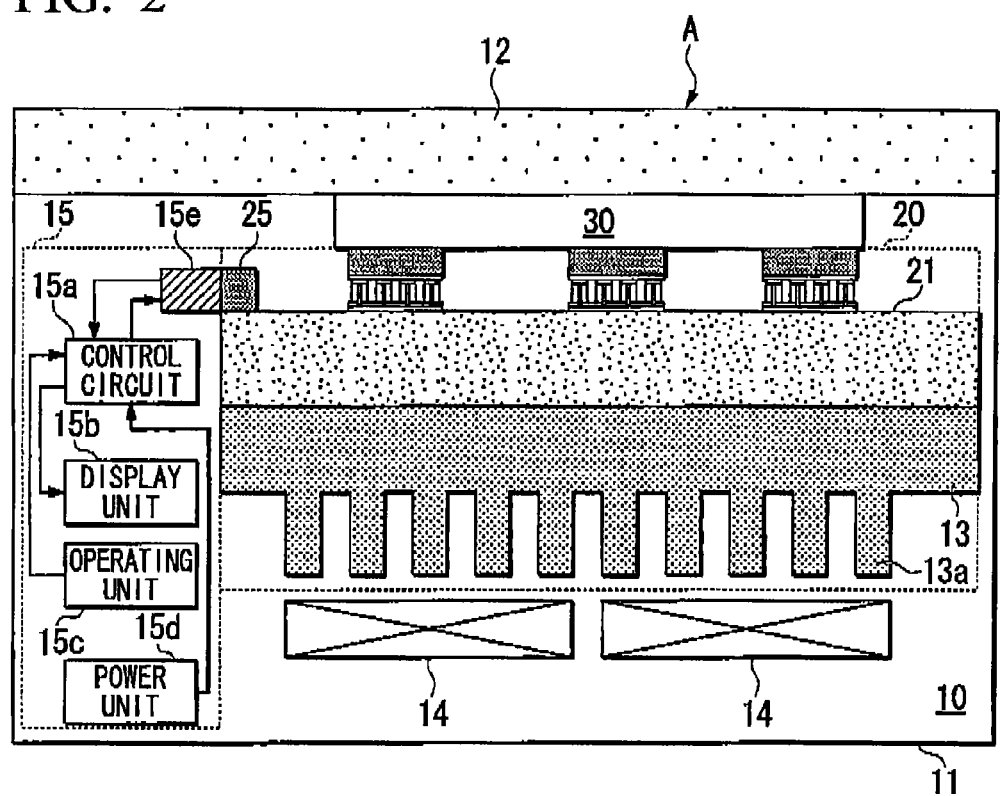
FIG. 2 is a schematic view illustrating a temperature control apparatus of FIG. 1 on which a microchemical chip is mounted.
Figure 3A:
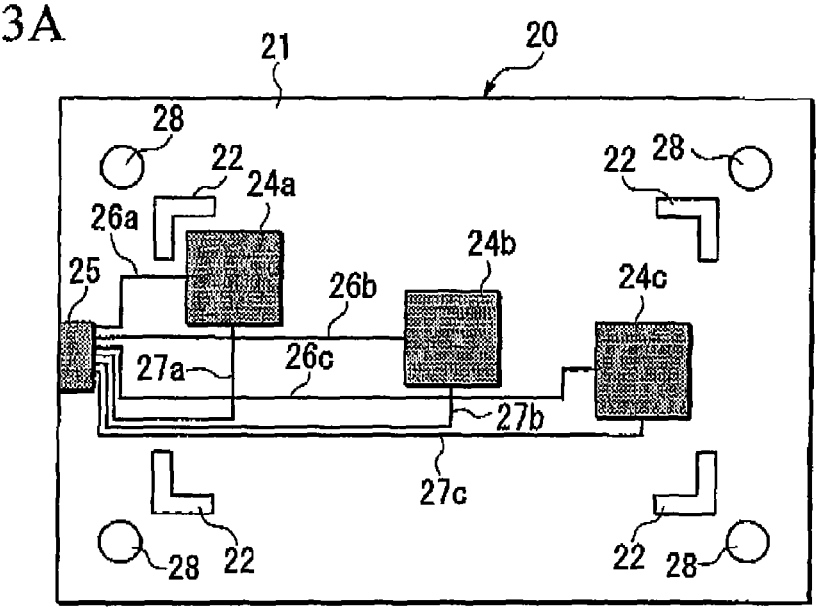
FIG. 3A is a plan view illustrating a temperature regulation board to be used in the temperature control apparatus of FIG. 1.
Figure 3B:
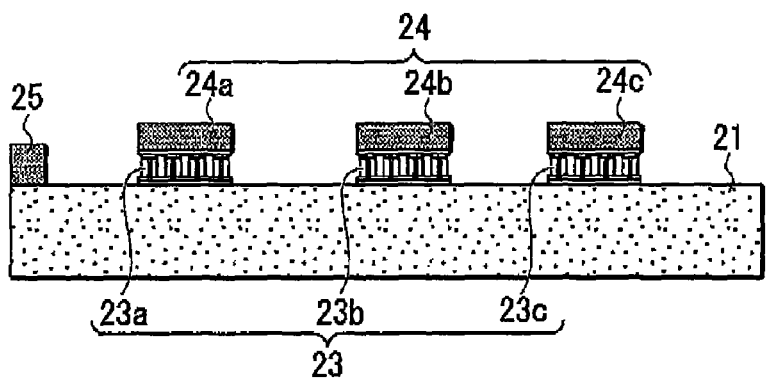
FIG. 3B is a fragmentary cross sectional elevation view illustrating the temperature regulation board of FIG. 3A.
Figure 4:
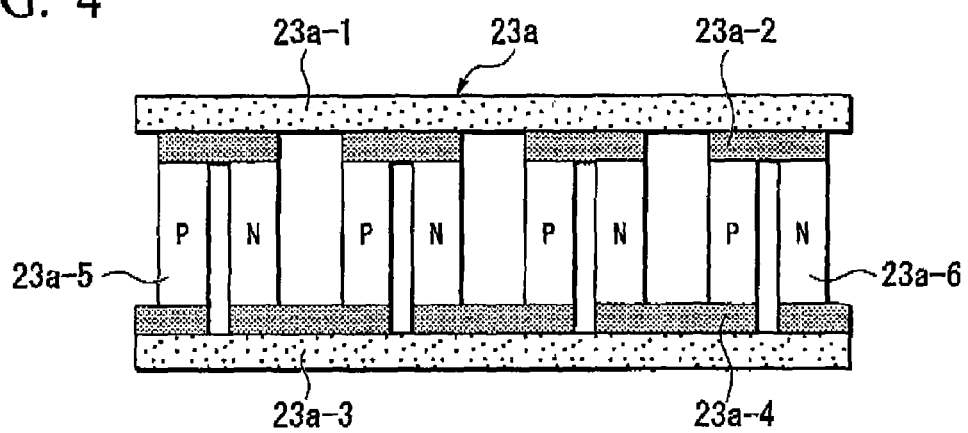
FIG. 4 is a fragmentary cross sectional elevation view illustrating a thermoelectric module to be mounted on the temperature regulation board of FIGS. 3A and 3B.
Figure 5:
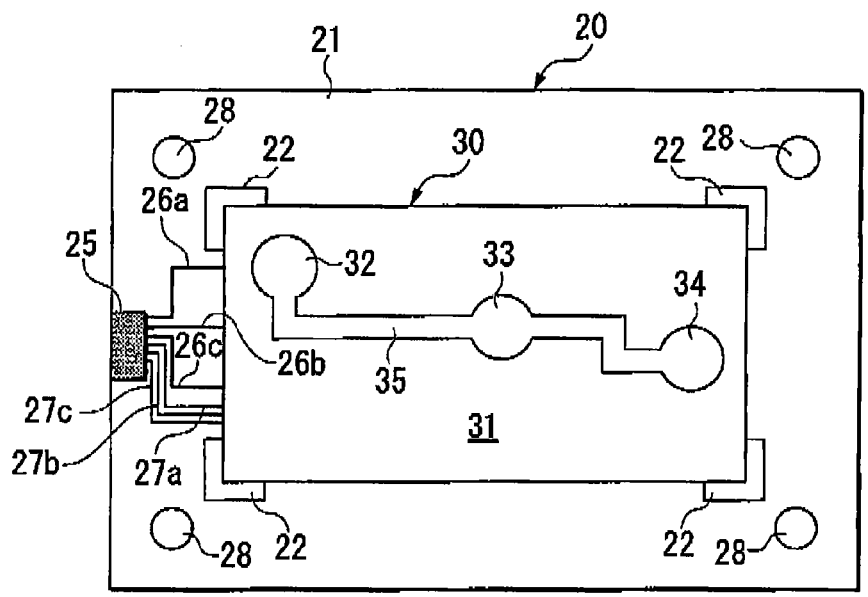
FIG. 5 is a plan view illustrating the temperature regulation board of FIGS. 3A and 3B on which a microchemical chip is mounted.
Figure 6:
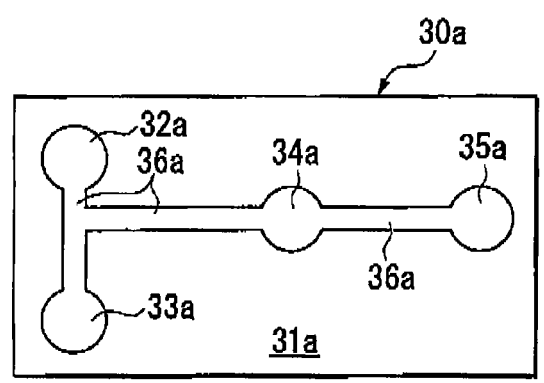
FIG. 6 is a plan view illustrating a first modified microchemical chip in accordance with a first modification of the first embodiment of the present invention.
Figure 7:
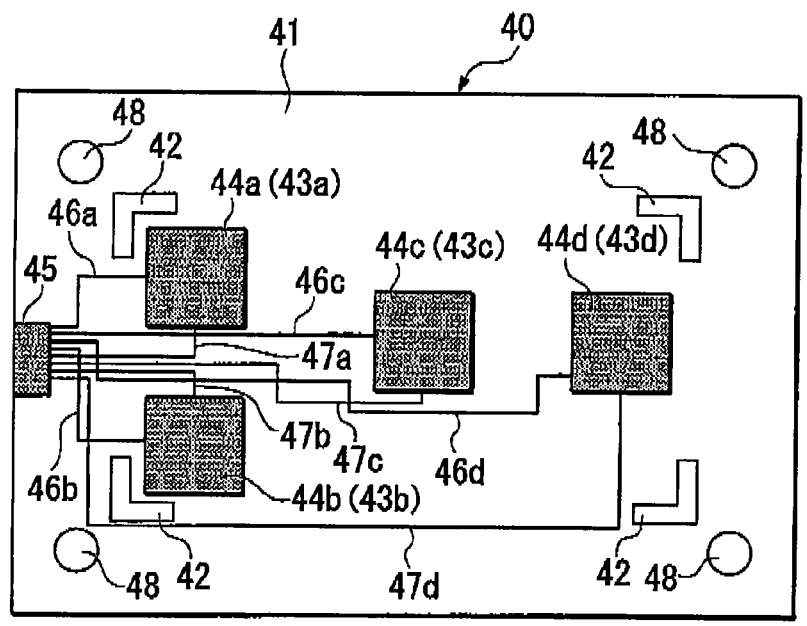
FIG. 7 is a plan view illustrating a temperature regulation board suitable for mounting the first modified microchemical chip of FIG. 6 thereon.
Figure 9:
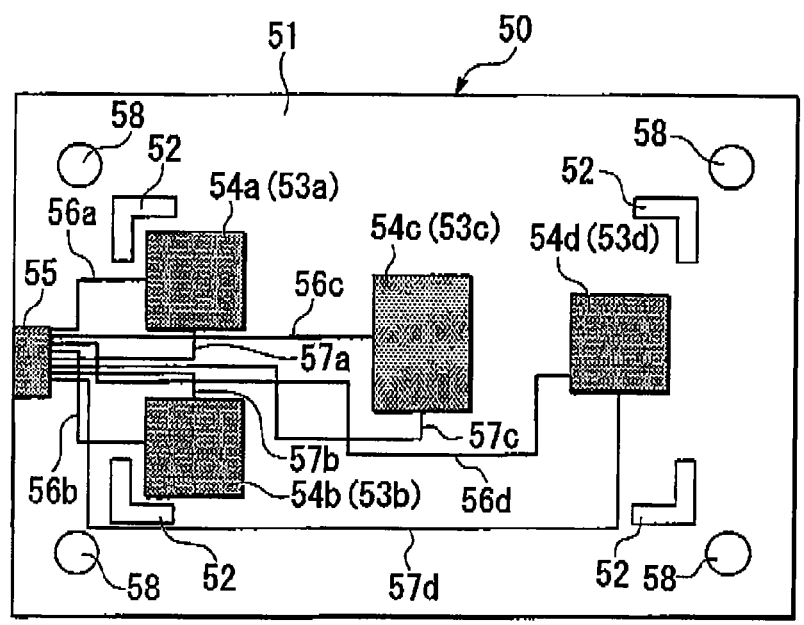
FIG. 9 is a plan view illustrating a temperature regulation board suitable for mounting the second modified microchemical chip of FIG. 8 thereon.
Figure 10:
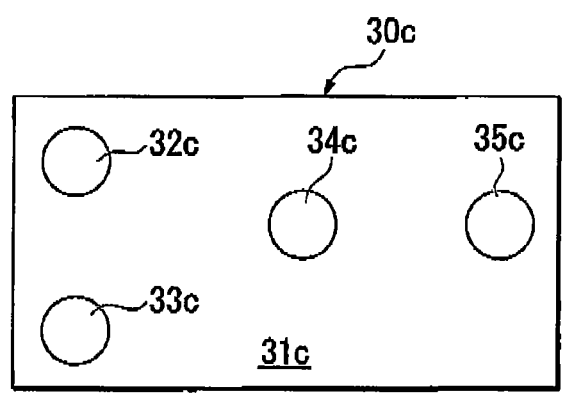
FIG. 10 is a plan view illustrating a third modified microchemical chip in accordance with a third modification of the first embodiment of the present invention.

A temperature control apparatus for a microchemical chip will be described. FIG. 1 is a schematic view illustrating a temperature control apparatus suitable for a microchemical chip in accordance with a first embodiment of the present invention. FIG. 2 is a schematic view illustrating a temperature control apparatus of FIG. 1 on which a microchemical chip is mounted. FIG. 3A is a plan view illustrating a temperature regulation board to be used in the temperature control apparatus of FIG. 1. FIG. 3B is a fragmentary cross sectional elevation view illustrating the temperature regulation board of FIG. 3A. FIG. 4 is a fragmentary cross sectional elevation view illustrating a thermoelectric module to be mounted on the temperature regulation board of FIGS. 3A and 3B. FIG. 5 is a plan view illustrating the temperature regulation board of FIGS. 3A and 3B on which a microchemical chip is mounted. FIG. 6 is a plan view illustrating a first modified microchemical chip in accordance with a first modification of the first embodiment of the present invention FIG. 7 is a plan view illustrating a temperature regulation board suitable for mounting the first modified microchemical chip of FIG. 6 thereon, FIG. 5 is a plan view illustrating a second modified microchemical chip in accordance with a second modification of the first embodiment of the present invention. FIG. 9 is a plan view illustrating a temperature regulation board suitable for mounting the second modified microchemical chip of FIG. 8 thereon. FIG. 10 is a plan view illustrating a third modified microchemical chip in accordance with a third modification of the first embodiment of the present invention.

A temperature control apparatus "A" for a microchemical chip may include, but is not limited to, a body 10 that is contained in a casing 11. The casing 11 is covered by a cover member 12. The body 10 may include, but is not limited to, a mounting stage 13, at least one electric fan 14, a control unit 15, and a temperature regulation board 20. The mounting stage 13 has a first surface on which the temperature regulation board 20 is mounted. The temperature regulation board 20 may further include, but is not limited to, a board 21, at least one thermoelectric module 23, and at least one heat conductor 24, and a first connector 25. The board 21 has a first surface that is adjacent to or securely contacts with the first surface of the mounting stage 13. The board 21 has a second surface opposing to the first surface. Advantageously, a plurality of thermoelectric modules 23 can be placed on the second surface of the board 21. The plurality of thermoelectric modules 23 can advantageously be distanced from each other. The heat conductor 24 is placed on each of the plurality of thermoelectric modules 23. The first connector 25 can advantageously be placed on the second surface of the board 21.

As shown in FIG. 2, the microchemical chip 30 can advantageously be placed on the temperature regulation board 20 so that the microchemical chip 30 is adjacent to or contacts with the heat conductors 24 that are provided on the thermoelectric modules 23. The microchemical chip 30 may include one or more chemical reactors. The microchemical chip 30 may include, but is not limited to, first, second and third chemical reactors 32, 33, and 34 shown in FIG. 5, for example. The temperature regulation board 20 is configured to regulate a temperature of each of the chemical reactors of the microchemical chip 30.

The cover member 12 is configured to cover the casing 11. The mounting stage 13 is configured to allow the temperature regulation board 20 to be mounted on the first surface thereof. The mounting stage 13 can advantageously be configured to perform as a heat sink. The mounting stage 13 has a second surface that has a plurality of radiator fins 13a. The plurality of radiator fins 13a extends downwardly from the second surface of the mounting stage 13. The plurality of electric fan 14 can advantageously be provided under the plurality of radiator fins 13a of the mounting stage 13 so that the plurality of electric fan 14 faces toward, but is distanced from, the plurality of radiator fins 13a. The plurality of electric fan 14 is configured to cool the mounting stage 13.

The temperature regulation board 20 further includes at one thermoelectric module. The temperature regulation board 20 may advantageously include a plurality of thermoelectric modules 23. The control unit 15 is configured to control the plurality of thermoelectric modules 23 of the temperature regulation board 20.

The cover member 12 covers the casing 11. The cover member 12 can advantageously perform as a pressing member that presses the microchemical chip 30 downwardly. Namely, the cover member 12 can advantageously be configured to press downwardly the microchemical chip 30 that is mounted on the temperature regulation board 20 so that the microchemical chip 30 is thermally engaged with the heat conductors 24. The microchemical chip 30 can advantageously contact with the heat conductors 24. The heat conductors 24 are configured to thermally engage the microchemical chip 30 with the plurality of thermoelectric modules 23. The cover member 12 can include, but is not limited to, a structure to apply a mechanical force to the microchemical chip 30 downwardly. Typical examples of the mechanical force applying structure may include, but is not limited to, a spring mechanism, an elastic member. The cover member 12 may advantageously be made of, but not limited to, an elastic material. Also, the cover member 12 may advantageously have a spring member configured to apply a mechanical force to the microchemical chip 30 downwardly.

The cover member 12 can advantageously have a heat conductivity that is lower than that of the heat conductors 24 so that the microchemical chip 30 is thermally engaged with the thermoelectric modules 23 and thermally disengaged from the cover member 12. Preferably, the cover member 12 can be configured to give no significant influence to the temperature profile of the microchemical chip 30. The cover member 12 can be made of a material that is poor in heat conductivity. Typical examples of the material of the cover member 12 may include, but is not limited to, urethane foam, nitrile rubber, and glass. The cover member 12 can advantageously be configured to cover entirely or partially the microchemical chip 30.

The cover member 12 can advantageously be modified provided that the cover member 12 is configured to press the microchemical chip 30. The cover member 12 can be configured to cover entirely or partially the microchemical chip 30.

A force-applying device can advantageously be used to apply a force to the microchemical chip 30 so that the microchemical chip 30 is forced to contact with the plurality of heat conductors 24 of the temperature regulation board 20. Typical examples of the force-applying device may include, but are not limited to, a pressing device and a suction device. The pressing device can be configured to be dedicated to press the microchemical chip 30 against the temperature regulation board 20 so that the microchemical chip 30 is forced to contact with the plurality of heat conductors 24 of the temperature regulation board 20. The pressing device can also be configured to cover the microchemical chip 30 and to press the microchemical chip 30 against the temperature regulation board 20 so that the microchemical chip 30 is forced to contact with the plurality of heat conductors 24 of the temperature regulation board 20. The suction device can be configured to suck the microchemical chip 30 so that the microchemical chip 30 is forced to contact with the plurality of heat conductors 24 of the temperature regulation board 20.

The mounting stage 13 can additionally and advantageously be configured to perform as a heat sink of the temperature regulation board 20. The mounting stage 13 can advantageously be made of a heat conductive material. Typical examples of the heat conductive material of the mounting stage 13 may include, but are not limited to, aluminum and aluminum alloys. As described above, the plurality of radiator fins 13a extends downwardly from the second surface of the mounting stage 13 toward the plurality of electric fins 14. The plurality of radiator fins 13a can advantageously be configured to improve the heat radiation performance of the mounting stage 13. Further, advantageously, the electric fins 14 are placed facing to the plurality of radiator fins 13a of the mounting stage 13.

As a modification, it is preferable to further attach heat sheets onto the plurality of heat conductors 24 so that the heat sheets provide a secured contact between the plurality of heat conductors 24 and the microchemical chip 30. It is also possible as a further modification to interpose grease between the plurality of heat conductors 24 and the microchemical chip 30, thereby reducing a heat resistance between the plurality of heat conductors 24 and the microchemical chip 30.

The control unit 15 may further include, but is not limited to, a control circuit 15a, a display unit 15b, an operating unit 15c, a power unit 15d, and a second connector 15e. The control circuit 15a can advantageously be configured to control the intensity and the direction of a current that flows through each of the plurality of thermoelectric modules 23 so that each of the plurality of thermoelectric modules 23 has a target temperature that has previously been set. The control by the control circuit 15a can be performed in accordance with a known feedback method. A typical example of the feedback method may include, but is not limited to, a PID control method. The PID control method has been well known to control temperature. The feedback method such as the PID control method can be realized by using a temperature sensor that is provided in each of the heat conductors 24. For example, the control circuit 15a can advantageously be configured to control the intensity and the direction of the current with reference to output signals from the temperature sensors provided in the heat conductors 24. The temperature sensors are not illustrated in the drawings. Preferably, the control circuit 15a can be configured to control the current thereby controlling a measured temperature in a set range of ±0.1° C. from the target temperature.

The display unit 15b can operatively be coupled to the control circuit 15a so as to display a measured temperature in real time and a set temperature. The operating unit 15c can advantageously be configured to set and change the target temperature of each of the plurality of thermoelectric modules 23 independently. The operating unit 15c has an interface to a user to allow the user to operate the operating unit 15c. A typical example of the user interface may include, but is not limited to, one or more switches. The power unit 15d can advantageously be configured to convert a commercial alternating-current voltage into a direct-current voltage and supply the converted direct-current voltage to the control circuit 15a. The second connector 15e is configured to connect with the first connector 25 that is provided on the second surface of the board 21.

As shown in FIGS. 3A and 3B, the temperature regulation board 20 may further include, but is not limited to, the board 21, a plurality of positioning guides 22, the plurality of thermoelectric modules 23, the plurality of beat conductors 24, the first connector 25, a first plurality of wirings 26, and a second plurality of wirings 27, and a plurality of attachment holes 28. The board 21 can advantageously be made of aluminum or an aluminum alloy. The plurality of positioning guides 22 are provided on the second surface of the board 21 so as to define a virtual area in which the plurality of thermoelectric modules 23 is provided. In a case, the plurality of thermoelectric modules 23 may include, but is not limited to, first, second and third thermoelectric modules 23a, 23b and 23c.

The plurality of positioning guides 22 can be modified, provided that the plurality of positioning guides 22 facilitates positioning the microchemical chip 30. In a case, the plurality of positioning guides 22 can advantageously be configured to be projected from the second surface of the board 21. In another case, the positioning guide can advantageously be configured to provide a depressing portion that receives or engages the microchemical chip 30. In another case, the positioning guide can advantageously be configured to provide a pair of markers on the board 21 and the microchemical chip 30 so that the microchemical chip 30 can be aligned to the board 21 with reference to the pair of markers.

Typically, the microchemical chip 30 may include, but is not limited to, a chip substrate 31 and first, second and third chemical reactors 32, 33, and 34 that are distanced from each other but are inter-connected through channels 35. The plurality of heat conductors 24 are provided on the plurality of thermoelectric modules 23. Each of the plurality of heat conductors 24 can advantageously be configured to transfer a heat from each of the plurality of thermoelectric modules 23 to at least one chemical reactor of the microchemical chip 30. The heat has been generated by each of the plurality of thermoelectric modules 23. The heat may be either warm or cold. The plurality of heat conductors 24 can be made of copper or aluminum.

The first plurality of wirings 26 are connected to the plurality of thermoelectric modules 23. For example, first, second and third wirings 26a, 26b and 26c are connected to the first, second and third thermoelectric modules 23a, 23b and 23c, respectively. The second plurality of wirings 27 are connected to the plurality of temperature sensors provided in the plurality of heat conductors 24 that are provided on the plurality of thermoelectric modules 23. For example, fourth, fifth and sixth wirings 27a, 27b and 27c are connected to the first, second and third temperature sensors provided in first second and third heat conductors 24a, 24b and 24c that are provided on the first second and third thermoelectric modules 23a, 23b and 23c, respectively.

The first connector 25 is connected through the first wiring 26a to the first thermoelectric module 23a. The first connector 25 is also connected through the fourth wiring 27a to the first temperature sensor provided in the first heat conductor 24a that is provided on the first thermoelectric module 23a. The first connector 25 is also connected through the second wiring 26b to the second thermoelectric module 23b. The first connector 25 is also connected through the fifth wiring 27b to the second temperature sensor provided in the second heat conductor 24b that is provided on the second thermoelectric module 23b. The first connector 25 is also connected through the third wiring 26c to the third thermoelectric module 23c. The first connector 25 is also connected through the sixth wiring 27c to the third temperature sensor provided in the third heat conductor 24c flat is provided on the third thermoelectric module 23c.

The temperature regulation board 20 has four corners, each having the attachment hole 28 for attaching the temperature regulation board 20 to the body 10 of the temperature control apparatus.

As a modification, it is preferable to further attach heat sheets onto the plurality of heat conductors 24 so that the heat sheets provide a secured contact between the plurality of heat conductors 24 and the microchemical chip 30. It is also possible as a further modification to interpose grease between the plurality of heat conductors 24 and the microchemical chip 30, thereby reducing a heat resistance between the plurality of heat conductors 24 and the microchemical chip 30.

The plurality of thermoelectric modules 23 may advantageously be positioned corresponding to the plurality of chemical reactors of the microchemical chip 30. For example, the first, second and third thermoelectric modules 23 may be positioned corresponding to the first, second and third chemical reactors 32, 33 and 34, respectively.

As described above, the temperatures sensors are provided in the plurality of heat conductors 24. The temperature sensors are configured to measure temperatures of the plurality of thermoelectric modules 23 individually. For examples, the temperature sensors in the first, second and third heat conductors 24a, 24b, and 24c are configured to measure temperatures of the first, second and third thermoelectric modules 23a, 23b and 23c, respectively. The temperature sensor can be realized by, but not limited to, a thermister, a platinum resistance temperature sensor, and a thermocouple. The temperature sensors in the first, second, and third heat conductors 24a, 24b, and 24c are connected through the fourth, fifth, and sixth wirings 27a, 27b, and 27c to signal terminals of the first connector 25.

The first, second, and third thermoelectric modules 23a, 23b, and 23c are connected through the first, second, and third wirings 26a, 26b, and 26c to power terminals of the first connector 25. The first, second, and third thermoelectric modules 23a, 23b, and 23c can be bonded to the board 21 by using an adhesive agent or a solder. A typical example of the adhesive agent may include, but is not limited to, a filler epoxy adhesive agent, and a silicone-based adhesive agent.

The plurality of thermoelectric modules 23 has the same structure. Whereas FIG. 4 illustrates the structure of the first thermoelectric module 23a, the second and third thermoelectric modules 23b and 23c have the same structure as the first thermoelectric module 23a. The first thermoelectric module 23a may include, but is not limited to, a first substrate 23a-1, a first electrode pattern 23a-2, a second substrate 23a-3, a second electrode pattern 23a-4, and a plurality of Peltier devices. The first electrode pattern 23a-2 is provided on the first substrate 23a-1. The second electrode pattern 23a-4 is provided on the second substrate 23a-3. The first and second substrates 23a-1 and 23a-3 are placed in parallel to each other so tat the first and second electrode patterns 23a-2 and 23a-4 face to each other and are distanced from each other. The plurality of Peltier devices is interposed between the first and second electrode patterns 23a-2 and 23a-4.

The plurality of Peltier devices is connected between the first and second electrode patterns 23a-2 and 23a-4. The plurality of Peltier devices may include, but is not limited to, a plurality of series connections of p-type compound semiconductor device 23a-5 and n-type compound semiconductor device 23a-6. The p-type compound semiconductor device 23a-5 is interposed between the first and second electrode patterns 23a-2 and 23a-4. The p-type compound semiconductor device 23a-5 is connected between the first and second electrode patterns 23a-2 and 23a-4. The n-type compound semiconductor device 23a-6 is interposed between the first and second electrode patterns 23a-2 and 23a-4. The n-type compound semiconductor device 23a-6 is connected between the first and second electrode patterns 23a-2 and 23a-4. The p-type compound semiconductor devices 23a-5 and the n-type compound semiconductor devices 23a-6 are alternately connected in series between the first and second electrode patterns 23a-2 and 23a-4. The p-type compound semiconductor devices 23a-5 and the n-type compound semiconductor devices 23a-6 can advantageously be solder-bonded to the first and second electrode patterns 23a-2 and 23a-4. Typical examples of the solder may include, but are not limited to, an SnSb alloy, an SnAgCu alloy, and an AuSn alloy.

A first one of the first and second electrode patterns 23a-2 and 23a-4 performs as a heat generator, while a second one of the first and second electrode patterns 23a-2 and 23a-4 performs as a cooler. The direction of the current that flows through the series connection of the p-type and n-type compound semiconductor devices 23a-5 and 23a-6 defines the roles as the heat generator and the cooler of the first and second electrode patterns 23a-2 and 23a-4. Namely, the issue of which one of the p-type and n-type compound semiconductor devices 23a-5 and 23a-6 performs as the heat generator while another performing as the cooler depends on the direction of the current flowing through the series connection of the p-type and n-type compound semiconductor devices 23a-5 and 23a-6. In a case, the first and second substrates 23a-1 and 23a-3 can advantageously be made of a ceramic such as alumina ($Al_2O_3$), aluminum nitride (AlN), and silicon carbide (SiC).

The first and second electrode patterns 23a-2 and 23a-4 can advantageously be formed on the first and second substrates 23a-1 and 23a-3 by a metal-plating process for forming a metal-plated layer and a subsequent etching process for selectively etching the metal-plated layer. The first and second electrode patterns 23a-2 and 23a-4 can advantageously be formed of a single-layered structure, a double-layered structure, and a triple-layered structure. A typical example of the single-layered structure may include, but is not limited to, a copper-plated layer. A typical example of the double-layered structure may include, but is not limited to, a copper-plated layer, and a nickel-plated layer over the copper-plated layer. A typical example of the triple-layered structure may include, but is not limited to, a copper-plated layer, a nickel-plated layer over the copper-plated layer, and a gold-plated layer over the nickel-plated layer.

As described above, the first one of the first and second electrode patterns 23a-2 and 23a-4 performs as a heat generator, while the second one thereof performs as a cooler. The second one of the first and second electrode patterns 23a-2 and 23a-4 can advantageously be configured to perform a heat exchange which allows the first one of the first thermoelectric module 23a to perform the temperature regulation. The temperature regulation board 20 can advantageously be provided in contact with the mounting stage 13 that performs as a heat sink.

As described above, the mounting stage 13 can further advantageously be configured to have the plurality of radiator fins 13a, while the electric fans 14 can also advantageously be placed under the plurality of radiator fins 13a, in order to further improve the performance of heat exchange. The first one of the first and second electrode patterns 23a-2 and 23a-4 is closer to the microchemical chip 30 as compared to the second one thereof. The first one of the first and second electrode patterns 23a-2 and 23a-4 can advantageously be maintained at a target temperature, while the second one thereof performing the heat exchange, so as to maintain the plurality of chemical reactors 32, 33 and 34 of the microchemical chip 30 at a predetermined target temperature.

The dimensions of each of the plurality of thermoelectric modules 23 can advantageously be, but are not limited to, a few millimeters squire, for example, in a range of approximately 1 millimeter to 3 millimeters in squire. The dimensions of each of the plurality of thermoelectric modules 23 can define a local area in which the temperature regulation is made. The plurality of thermoelectric modules 23 can perform independent and localized temperature regulations of the plurality of chemical reactors 32, 33 and 34 of the microchemical chip 30.

The chip substrate 31 of the microchemical chip 30 can advantageously be made of a variety of materials, for example, but not limited to, glasses, resins, silicon, ceramics, semiconductors or metals. As shown in FIG. 5, the first, second, and third chemical reactors 32, 33 and 34 and the channels 35 are formed on or in the chip substrate 31. The first second, and third chemical reactors 32, 33 and 34 and the channels 35 can advantageously be formed by micro-processing. Typical examples of the micro-processing may include, but are not limited to, machining, chemical etching, and lithography. In the first, second, and third chemical reactors 32, 33 and 34 and the channels 35, a variety of chemical processes is carried out. Typical examples of the chemical processes may include, but are not limited to, storage, carrier, mixture, reaction, extraction, separation, condensation, and recovery. It is preferable for the first, second, and third chemical reactors 32, 33 and 34 and the channels 35 to be maintained at an optimum temperature during the chemical processes. The microchemical chip 30 can advantageously be configured to have a reagent-introduction port and/or a reagent-discharge port.

Operations of the above-described temperature control apparatus "A" for microchemical chip will be described. The temperature regulation board 20 shown in FIGS. 3A and 3B is prepared. As shown in FIG. 1, the temperature regulation board 20 is placed on the mounting stage 13 that is provided in the body 10. The temperature regulation board 20 can advantageously be attached to the mounting stage 13 by using screws penetrating through the attachment holes 28. The first and second connectors 25 and 15e are connected with each other. The microchemical chip 30 is placed on the heat conductors 24a, 24b, and 24c over the first, second and third thermoelectric modules 23a, 23b and 23c so that the microchemical chip 30 is positioned within a positioning area that is defined by the positioning guides 22.

The cover member 12 is placed over the casing 11, while the cover member 12 pushing the microchemical chip 30 against the temperature regulation board 20. As a result, the microchemical chip 30 is made into securely contact with the heat conductors 24 that are provided on the first second and third thermoelectric modules 23a, 23b and 23c. The power unit 15d is operated to make power on. The operating unit 15c is then operated to set a target temperature, thereby applying currents to the first, second and third thermoelectric modules 23a, 23b and 23c. The intensity of the applied current depends upon the set target temperature. The applied currents flowing through the first second and third thermoelectric modules 23a, 23b and 23c are regulated independently to maintain the first, second and third chemical reactors 32, 33, and 34 at the set target temperatures separately. The regulation of the temperature may be either heating or cooling the microchemical chip 30. The temperature regulation of the chemical reactors 32, 33, and 34 can be made based on a predetermined pattern of temperature variation. A typical example of the predetermined pattern of temperature variation can advantageously be, but is not limited to, a multi-step temperature variation pattern. The temperature regulation can advantageously be made by a computer that is connected to the control circuit 15a.

The above-described temperature control apparatus "A" can advantageously be configured to allow the temperature regulation board 20 to be exchangeable so as to exchange the microchemical chip 30 into a different type one.

The first typical example of the microchemical chip has been described above with reference to FIG. 5. The first typical example of the temperature regulation board has been described above with reference to FIGS. 3A and 3B. It is possible to modify the microchemical chip and the temperature regulation board. FIG. 6 is a plan view illustrating a second typical example of the microchemical chip. FIG. 7 is a plan view illustrating a second typical example of the temperature regulation board that is suitable for the second typical example of the microchemical chip.

A first modified temperature regulation board 40 shown in FIG. 7 is configured to be suitable for a first modified microchemical chip 30a shown in FIG. 6. The first modified microchemical chip 30a may include, but is not limited to, a chip substrate 31a, first, second, third and fourth chemical reactors 32a, 33a, 34a, and 35a, and channels 36a. The first, second, third and fourth chemical reactors 32a, 33a, 34a, and 35a, and the channels 36a are formed on or in the chip substrate 31a.

The first, second, third and fourth chemical reactors 32a, 33a, 34a, and 35a are distanced from each other and interconnected to each other through the interconnection channels 36a. The second chemical reactor 33a is inter-connected to the first and third chemical reactors 32a and 34a tough the interconnection channels 36a. The third chemical reactor 34a is inter-connected to the first, second, and fourth chemical reactors 32a, 33a and 35a through the interconnection channels 36a. The fourth chemical reactor 35a is inter-connected to the third chemical reactor 34a through the interconnection channel 36a.

The first modified temperature regulation board 40 is configured to allow the first modified microchemical chip 30a to be placed on the first modified temperature regulation board 40. The first modified temperate regulation board 40 may include, but is not limited to, a board 41, first, second, third, and fourth thermoelectric modules 43a, 43b, 43c, and 43d, first, second, third, and fourth heat conductors 44a, 44b, 44c, and 44d, first, second, third, and fourth wirings 46a, 46b, 46c, and 46d, fifth, sixth, seventh and eighth wirings 47a, 47b, 47c and 47d, positioning guides 42, a first connector 45, and attachment holes 48.

The first, second, third, and fourth thermoelectric modules 43a, 43b, 43c, and 43d are provided on the board 41. The first second, third, and fourth thermoelectric modules 43a, 43b, 43c, and 43d are positioned corresponding to the first, second, third and fourth chemical reactors 32a, 33a, 34a, and 35a of the microchemical chip 30a when the microchemical chip 30a is placed in a position area that is defined by the positioning guides 42. The first, second, third, and fourth heat conductors 44a, 44b, 44c, and 44d are provided on the first, second, third, and fourth thermoelectric modules 43a, 43b, 43c, and 43d, respectively.

The first, second, third, and fourth heat conductors 44a, 44b, 44c, and 44d individually include first, second, third and fourth temperature sensors that are connected to the fifth, sixth, seventh and eighth wirings 47a, 47b, 47c and 47d, respectively. The temperature sensor can be realized by, but not limited to, a thermister, a platinum resistance temperature sensor, and a thermocouple. The fifth, sixth, seventh and eighth wirings 47a, 47b, 47c and 47d are further connected to signal terminals of the first connector 45. The first, second, third, and fourth thermoelectric modules 43a, 43b, 43c, and 43d are connected to the first, second, third, and fourth wirings 46a, 46b, 46c, and 46d, respectively. The first, second, third, and fourth wirings 46a, 46b, 46c, and 46d are further connected to power terminals of the first connector 45.

Figure 8:
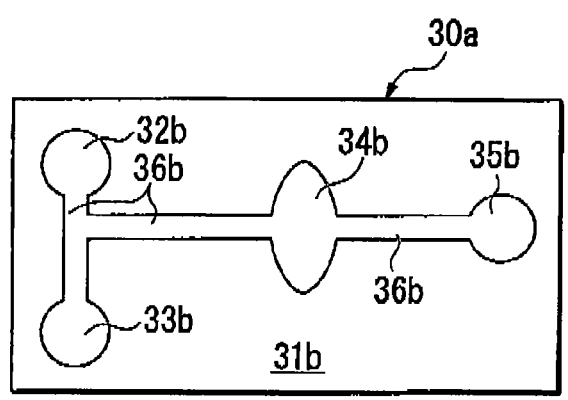
FIG. 8 is a plan view illustrating a second modified microchemical chip in accordance with a second modification of the first embodiment of the present invention.

FIG. 8 is a plan view illustrating a third typical example of the microchemical chip. FIG. 9 is a plan view illustrating a third typical example of the temperature regulation board that is suitable for the third typical example of the microchemical chip.

A second modified temperature regulation board 50 shown in FIG. 9 is configured to be suitable for a second modified microchemical chip 30b shown in FIG. 8, The second modified microchemical chip 30b may include, but is not limited to, a chip substrate 31b, fist, second, third and fourth chemical reactors 32b, 33b, 34b, and 35b, and channels 36a. The first, second, third and fourth chemical reactors 32b, 33b, 34b, and 35b, and the channels 36b are formed on or in the chip substrate 31b.

The first, second, third and fourth chemical reactors 32b, 33b, 34b, and 35b are distanced from each other and inter-connected to each other through the interconnection channels 36b. The second chemical reactor 33b is inter-connected to the first and third chemical reactors 32b and 34b through the interconnection channels 36b. The third chemical reactor 34b is inter-connected to the first, second, and fourth chemical reactors 32b, 33b and 35b through the interconnection channels 36b. The four chemical reactor 35b is interconnected to the third chemical reactor 34b through the interconnection channel 36b.

The second modified temperature regulation board 50 is configured to allow the second modified microchemical chip 30b to be placed on the second modified temperature regulation board 50. The second modified temperature regulation board 50 may include, but is not limited to, a board 51, first, second and third thermoelectric modules 53a, 53b, and 53d, a heater 53c, first, second, third, and fourth heat conductors 54a, 54b, 54c, and 54d, first, second, third, and fourth wirings 56a, 56b, 56c, and 56d, fifth, sixth, seventh and eighth wirings 57a, 57b, 57c and 57d, positioning guides 52, a first connector 55, and attachment holes 58.

The first, second, and third thermoelectric modules 53a, 53b, and 53d and the heater 53c are provided on the board 41. The first, second, and third thermoelectric modules 53a, 53b, and 53d are positioned corresponding to the first, second, and fourth chemical reactors 32b, 33b, and 35b of the microchemical chip 30b, while the heater 53c being positioned corresponding to the third chemical reactor 34b when the microchemical chip 30b is placed in a position area that is defined by the positioning guides 52. The first, second, and fourth heat conductors 54a, 54b, and 54d are provided on the first, second and third thermoelectric modules 53a, 53b, and 53d, respectively, while the third heat conductor 54c being provided on the heater 53c.

The first, second, third, and fourth heat conductors 54a, 54b, 54c, and 54d individually include first, second, third and fourth temperature sensors that are connected to the fifth, sixth, seventh and eighth wirings 57a, 57b, 57c and 57d, respectively. The temperature sensor can be realized by, but not limited to, a thermister, a platinum resistance temperature sensor, and a thermocouple. The fifth, sixth, seventh and eighth wirings 57a, 57b, 57c and 57d are further connected to signal terminals of the first connector 55. The first, second, and third thermoelectric modules 53a, 53b, and 53d are connected to the first, second, and fourth wirings 56a, 56b, and 56d, respectively. The heater 53c is connected to the third wiring 56c. The first, second, third, and fourth wirings 56a, 56b, 56c, and 56d are further connected to power terminals of the first connector 55.

FIG. 10 is a plan view illustrating a fourth typical example of the microchemical chip. The above-described first modified temperature regulation board 40 shown in FIG. 7 is configured to be suitable for a third modified microchemical chip 30c shown in FIG. 10. The third modified microchemical chip 30c may include, but is not limited to, a chip substrate 31c, first, second, third and fourth chemical reactors 32c, 33c, 34c, and 35c. The first, second, third and fourth discrete chemical reactors 32c, 33c, 34c, and 35c are formed on or in the chip substrate 31c.

The first, second, third and fourth discrete chemical reactors 32c, 33c, 34c, and 35c are distanced and separated from each other. No interconnection channel is provided. The above-described first modified temperature regulation board 40 is configured to allow the third modified microchemical chip 30c to be placed on the first modified temperature regulation board 40.

The first, second, third, and fourth thermoelectric modules 43a, 43b, 43c, and 43d of the above-described first modified temperature regulation board 40 are positioned corresponding to the first, second, third and fourth discrete chemical reactors 32c, 33c, 34c, and 35c of the third modified microchemical chip 30c when the third modified microchemical chip 30c is placed in the position area that is defined by the positioning guides 42.

The first, second, third and fourth discrete chemical reactors 32c, 33c, 34c, and 35c allow independent temperature regulations. The third modified microchemical chip 30c allows the same text sample and the same text reagent to be used to make independent evaluations under different temperature conditions of the first, second, third and fourth discrete chemical reactors 32c, 33c, 34c, and 35c.

The plurality of electric fins 14 can be connected through a power line to a power terminal of the first connector 25 that is provided on the board 21 of the temperature regulation board 20. The first connector 25 is further connected with the second connector 15e of the control unit 15.

Second Embodiment

Figure 11A:
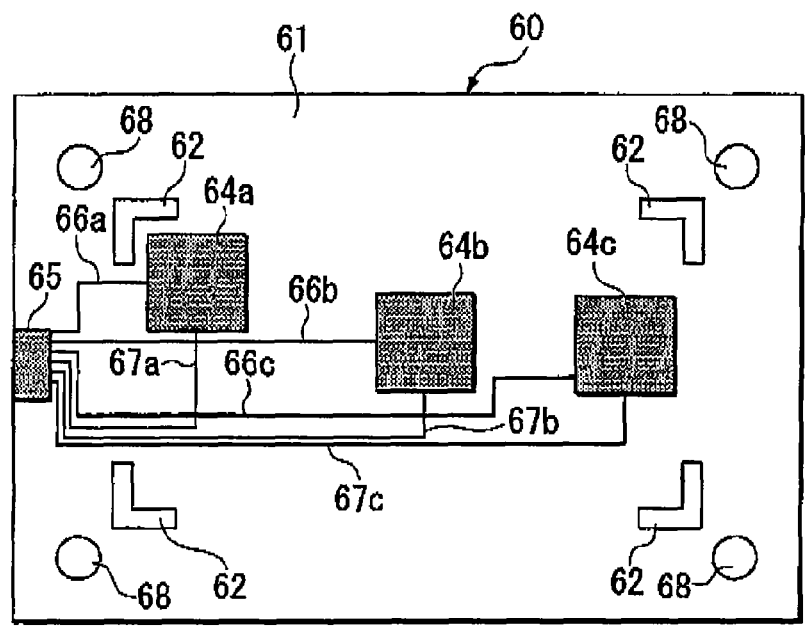
FIG. 11A is a plan view illustrating a temperature regulation board to be used in the temperature control apparatus in accordance with a second embodiment of the present invention.
Figure 11B:
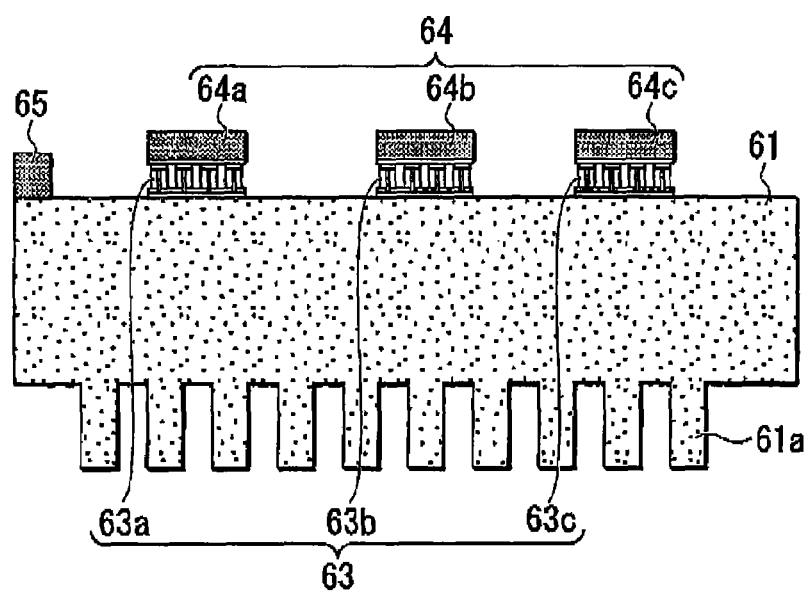
FIG. 11B is a fragmentary cross sectional elevation view illustrating the temperature regulation board of FIG. 11A.
Figure 12:
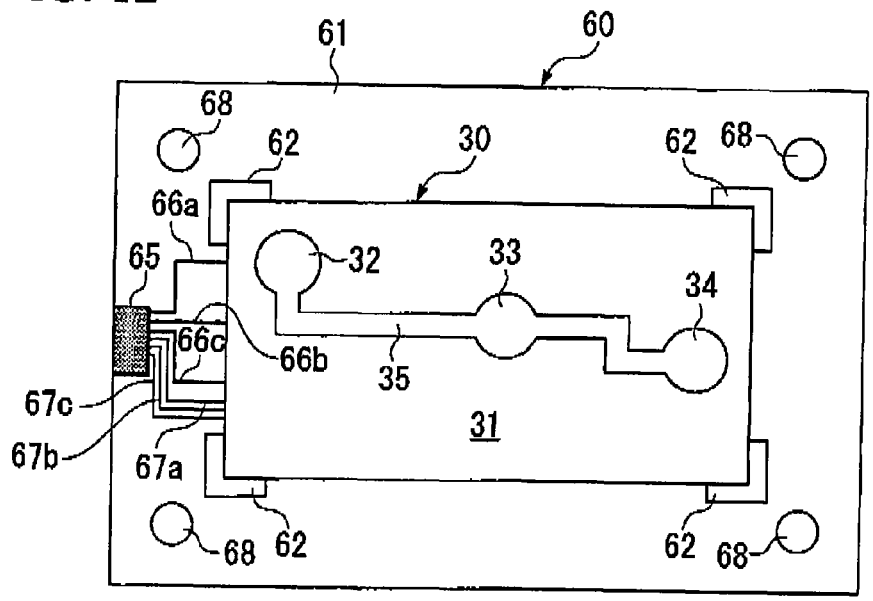
FIG. 12 is a plan view illustrating the temperature regulation board of FIGS. 11A and 11B on which a microchemical chip is mounted.
Figure 13:
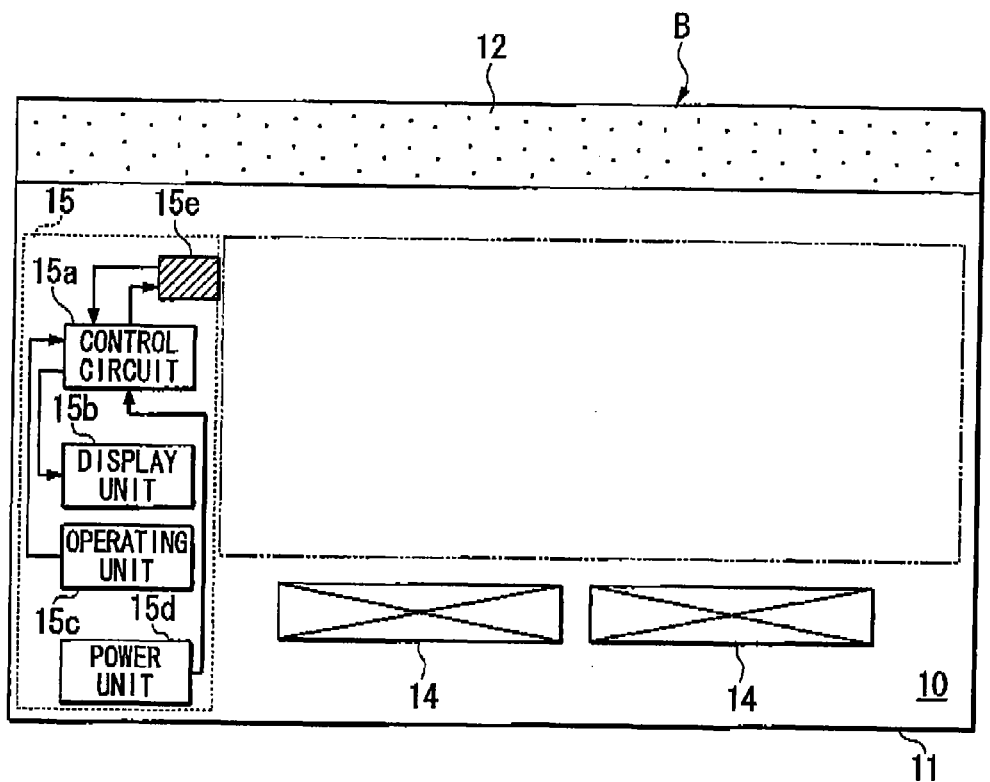
FIG. 13 is a schematic view illustrating the temperature control apparatus in which the temperature regulation board of FIGS. 11A and 11B is not mounted.
Figure 14:
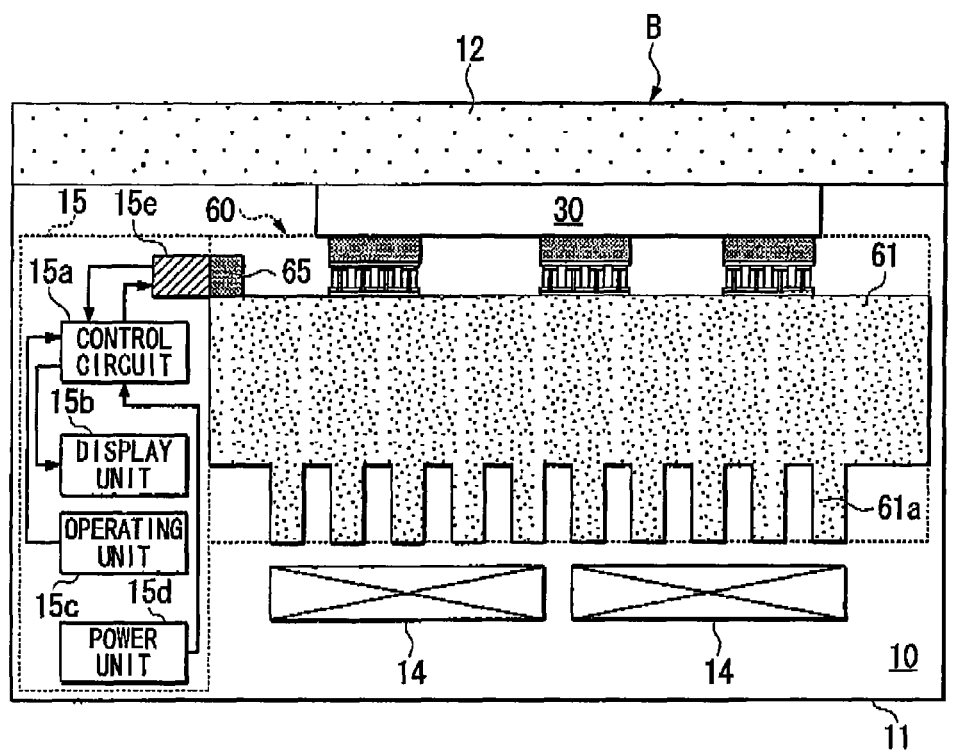
FIG. 14 is a schematic view illustrating the temperature control apparatus in which the temperature regulation board of FIGS. 11A and 11B with the microchemical chip is mounted.

Another temperature control apparatus for a microchemical chip will be described. FIG. 11A is a plan view illustrating a temperature regulation board to be used in the temperature control apparatus in accordance with a second embodiment of the present invention. FIG. 11B is a fragmentary cross sectional elevation view illustrating the temperature regulation board of FIG. 11A. FIG. 12 is a plan view illustrating the temperature regulation board of FIGS. 11A and 11B on which a microchemical chip is mounted. FIG. 13 is a schematic view illustrating the temperature control apparatus in which the temperature regulation board of FIGS. 11A and 11B is not mounted. FIG. 14 is a schematic view illustrating the temperature control apparatus in which the temperature regulation board of FIGS. 11A and 11B with the microchemical chip is mounted. The following descriptions will be highlighted to differences of the second embodiment from the above-described first embodiment.

In accordance with the above-described first embodiment of the present invention, the board 21 is mounted on the mounting stage 13 having the plurality of radiator fins 13a that perform as the heat sink. A temperature regulation board 60 includes the board 21 that is discrete from the mounting stage 13 performing as the beat sink.

In accordance with the second embodiment of the present invention, the board of the temperature regulation board is configured to allow a plurality of thermoelectric modules to be mounted thereon. The board of the temperature regulation board is also configured to perform as a heat sink. The board can advantageously include, but is not limited to, a plurality of radiator fins. The board may advantageously be greater in thickness than that of the board 21 of the above-described first embodiment of the present invention. The board of the temperature regulation board of this second embodiment performs both as a mounting board for mounting the plurality of thermoelectric modules thereon and as a heat sink for radiating a heat. This integrated structure can improve the heat exhaust efficiency thereby improving the accuracy in temperature regulation.

As shown in FIGS. 13 and 14, a temperature control apparatus "B" for a microchemical chip may include, but is not limited to, a body 10 that is contained in a casing 11. The casing 11 is covered by a cover member 12. The body 10 may include, but is not limited to, at least one electric fan 14, a control unit 15, and a temperature regulation board 60. The temperature regulation board 60 may further include, but is not limited to, a board 61, at least one thermoelectric module 63, and at least one heat conductor 64, and a first connector 65. The temperature regulation board 60 may advantageously include a plurality of thermoelectric modules 63. The control unit 15 is configured to control the plurality of thermoelectric modules 63 of the temperature regulation board 60.

As shown in FIG. 14, the microchemical chip 30 can advantageously be placed on the temperature regulation board 60 so that the microchemical chip 30 is adjacent to or contacts with the heat conductors 64 that are provided on the thermoelectric modules 63. The microchemical chip 30 may include one or more chemical reactors. The microchemical chip 30 may include, but is not limited to, first, second and third chemical reactors 32, 33, and 34 and channels 35 shown in FIG. 12, for example. The temperature regulation board 60 is configured to regulate a temperature of each of the chemical reactors of the microchemical chip 30.

The board 61 has first and second surfaces opposing to each other. A plurality of thermoelectric modules 63 can advantageously be placed on the first surface of the board 61. The plurality of thermoelectric modules 63 can advantageously be distanced from each other. The heat conductor 64 is placed on each of the plurality of thermoelectric modules 63. The first connector 65 can advantageously be placed on the second surface of the board 61.

Further, the board 61 can advantageously be configured to perform as a heat sink. The board 61 has the second surface that has a plurality of radiator fins 61a. The plurality of radiator fins 61a extends downwardly from the second surface of the board 61. The plurality of electric fan 14 can advantageously be provided under the plurality of radiator fins 61a of the board 61 so that the plurality of electric fan 14 faces toward, but is distanced from, the plurality of radiator fins 61a. The plurality of electric fan 14 is configured to cool the board 61. The board 61 can advantageously be made of a material that has heat conductivity. A typical example of the material for the board 61 may include, but is not limited to, aluminum and aluminum alloys.

The cover member 12 covers the casing 11. The cover member 12 can advantageously be configured to push downwardly the microchemical chip 30 that is mounted on the temperature regulation board 60 so that the microchemical chip 30 is thermally engaged with the temperature regulation board 60. The microchemical chip 30 can advantageously contact with the temperature regulation board 60. The temperature regulation board 60 is configured to thermally engage the microchemical chip 30 with the plurality of thermoelectric modules 23. The cover member 12 can include, but is not limited to, a structure to apply a mechanical force to the microchemical chip 30 downwardly. Typical examples of the mechanical force applying structure may include, but is not limited to, a spring mechanism, an elastic member. The cover member 12 may advantageously be made of, but not limited to, an elastic material.

A force-applying device can advantageously be used to apply a force to the microchemical chip 30 so that the microchemical chip 30 is forced to contact with the plurality of heat conductors 64 of the temperature regulation board 60. Typical examples of the force-applying device may include, but are not limited to, a pressing device and a suction device. The pressing device can be configured to be dedicated to press the microchemical chip 30 against the temperature regulation board 60 so that the microchemical chip 30 is forced to contact with the plurality of heat conductors 64 of the temperature regulation board 20. The pressing device can also be configured to cover the microchemical chip 30 and to press the microchemical chip 30 against the temperature regulation board 60 so that the microchemical chip 30 is forced to contact with the plurality of heat conductors 64 of the temperature regulation board 60. The suction device can be configured to suck the microchemical chip 30 so that the microchemical chip 30 is forced to contact with the plurality of heat conductors 64 of the temperature regulation board 60.

As shown in FIGS. 11A and 11B, the temperature regulation board 60 may further include, but is not limited to, the board 61, a plurality of positioning guides 62, the plurality of thermoelectric modules 63, the plurality of heat conductors 64, the first connector 65, a first plurality of wirings 66, and a second plurality of wirings 67, and a plurality of attachment holes 68. The board 61 can advantageously be made of aluminum or an aluminum alloy. The plurality of positioning guides 62 are provided on the second surface of the board 61 so as to define a virtual area in which the plurality of thermoelectric modules 63 is provided. In a case, the plurality of thermoelectric modules 63 may include, but is not limited to, first, second and third thermoelectric modules 63a, 63b and 63c.

The plurality of positioning guides 62 can be modified, provided that the plurality of positioning guides 62 facilitates positioning the microchemical chip 30. In a case, the plurality of positioning guides 62 can advantageously be configured to be projected from the second surface of the board 61. In another case, the positioning guide can advantageously be configured to provide a depressing portion that receives or engages the microchemical chip 30. In another case, the positioning guide can advantageously be configured to provide a pair of markers on the board 61 and the microchemical chip 30 so that the microchemical chip 30 can be aligned to the board 61 with reference to the pair of markers.

Typically, the microchemical chip 30 may include, but is not limited to, a chip substrate 31 and first, second and third chemical reactors 32, 33, and 34 that are distanced from each other but are inter-connected through channels 35. The plurality of heat conductors 64 are provided on the plurality of thermoelectric modules 63. Each of the plurality of heat conductors 64 can advantageously be configured to transfer a heat from each of the plurality of thermoelectric modules 63 to at least one chemical reactor of the microchemical chip 30. The heat has been generated by each of the plurality of thermoelectric modules 63. The heat may be either warm or cold. The plurality of heat conductors 64 can be made of copper or aluminum.

The first plurality of wirings 66 are connected to the plurality of thermoelectric modules 63. For example, first, second and third wirings 66a, 66b and 66c are connected to the first, second and third thermoelectric modules 23a, 23b and 23c, respectively. The second plurality of wirings 67 are connected to the plurality of temperature sensors provided in the plurality of heat conductors 64 that are provided on the plurality of thermoelectric modules 63. For example, fourth, fifth and sixth wirings 67a, 67b and 67c are connected to the first, second and third temperature sensors provided in first, second and third heat conductors 64a, 64b and 64c that are provided on the first, second and third thermoelectric modules 63a, 63b and 63c, respectively.

The first connector 65 is connected trough the first wiring 66a to the first thermoelectric module 63a. The first connector 65 is also connected through the fourth wiring 67a to the first temperature sensor provided in the first heat conductor 64a that is provided on the first thermoelectric module 63a. The first connector 65 is also connected through the second wiring 66b to the second thermoelectric module 63b. The first connector 65 is also connected through the fifth wiring 67b to the second temperature sensor provided in the second heat conductor 64b that is provided on the second thermoelectric module 63b. The first connector 65 is also connected through the third wiring 66c to the third thermoelectric module 63c. The first connector 65 is also connected through the sixth wiring 67c to the third temperature sensor provided in the third heat conductor 64c that is provided on the third thermoelectric module 63c.

The temperature regulation board 60 has four corners, each having the attachment hole 68 for attaching the temperature regulation board 60 to the body 10 of the temperature control apparatus.

As a modification, it is preferable to further attach heat sheets onto the plurality of heat conductors 64 so that the heat sheets provide a secured contact between the plurality of heat conductors 64 and the microchemical chip 30. It is also possible as a further modification to interpose grease between the plurality of heat conductors 64 and the microchemical chip 30, thereby reducing a heat resistance between the plurality of heat conductors 64 and the microchemical chip 30.

The plurality of thermoelectric modules 63 may advantageously be positioned corresponding to the plurality of chemical reactors of the microchemical chip 30. For example, the first, second and third thermoelectric modules 63 may be positioned corresponding to the first, second and third chemical reactors 32, 33 and 34, respectively.

As described above, the temperatures sensors are provided in the plurality of heat conductors 64. The temperature sensors are configured to measure temperatures of the plurality of thermoelectric modules 63 individually. For examples, the temperature sensors in the first, second and third heat conductors 64a, 64b, and 64c are configured to measure temperatures of the first, second and third thermoelectric modules 63a, 63b and 63c, respectively. The temperature sensor can be realized by, but not limited to, a thermister, a platinum resistance temperature sensor, and a thermocouple. The temperature sensors in the first, second, and third heat conductors 64a, 64b, and 64c are connected through the fourth, fifth, and sixth wirings 67a, 67b, and 67c to signal terminals of the first connector 65.

The first, second, and third thermoelectric modules 63a, 63b, and 63c are connected through the first, second, and third wirings 66a, 66b, and 66c to power terminals of the first connector 65. The first, second, and third thermoelectric modules 63a, 63b, and 63c can be bonded to the board 61 by using an adhesive agent or a solder. A typical example of the adhesive agent may include, but is not limited to, a filler epoxy adhesive-agent or a silicone-based adhesive agent.

As described above, the board 61 of the temperature regulation board 60 is configured to allow a plurality of thermoelectric modules 63 to be mounted thereon. The board 61 is also configured to perform as a beat sink. The board 61 has the plurality of radiator fins 61a. The board 61 may advantageously be greater in thickness than that of the board 21 of the above-described first embodiment of the present invention. The board 61 of the temperature regulation board 60 performs both as a mounting board for mounting the plurality of thermoelectric modules 63 thereon and as a heat sink for radiating a heat. This integration design can improve the heat exhaust efficiency thereby improving the accuracy in temperature regulation. The integration design makes it easy to change the design of the plurality of radiator fins 61a based on a desired quantity of exhaust heat, thereby improving the flexibility of the thermal design of the temperature control apparatus "B". The increase in dimensions of the radiator fins 61a increases the quantity of exhaust beat per unit area. The increase in density or the number of the radiator fins 61a increases the quantity of exhaust heat per unit area. The decrease in dimensions of the radiator fins 61a decreases the quantity of exhaust heat per unit area. The decrease in density or the number of the radiator fins 61a decreases the quantity of exhaust heat per unit area.

Third Embodiment

Figure 15A:
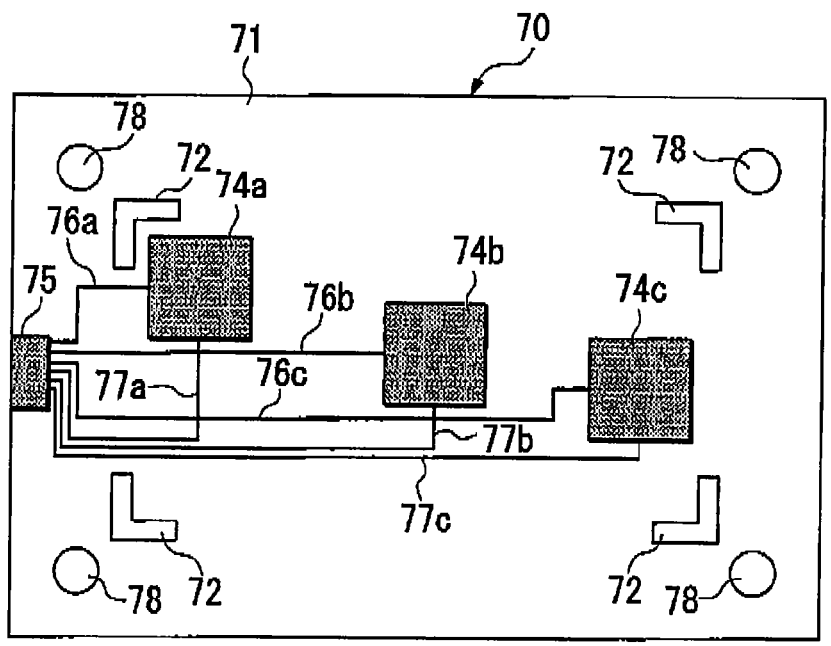
FIG. 15A is a plan view illustrating a temperature regulation board to be used in the temperature control apparatus in accordance with a third embodiment of the present invention.
Figure 15B:
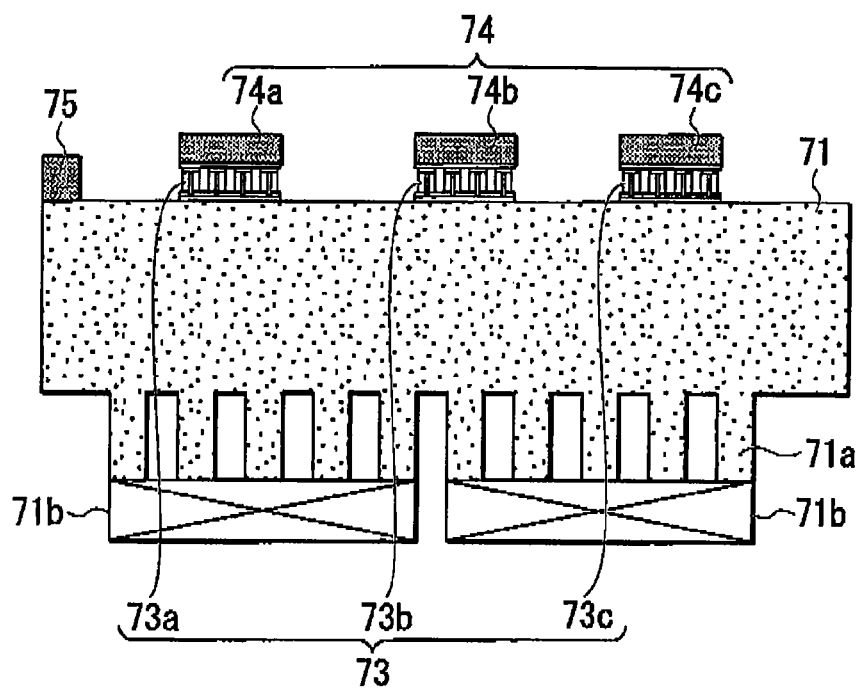
FIG. 15B is a fragmentary cross sectional elevation view illustrating the temperature regulation board of FIG. 15A.
Figure 16:
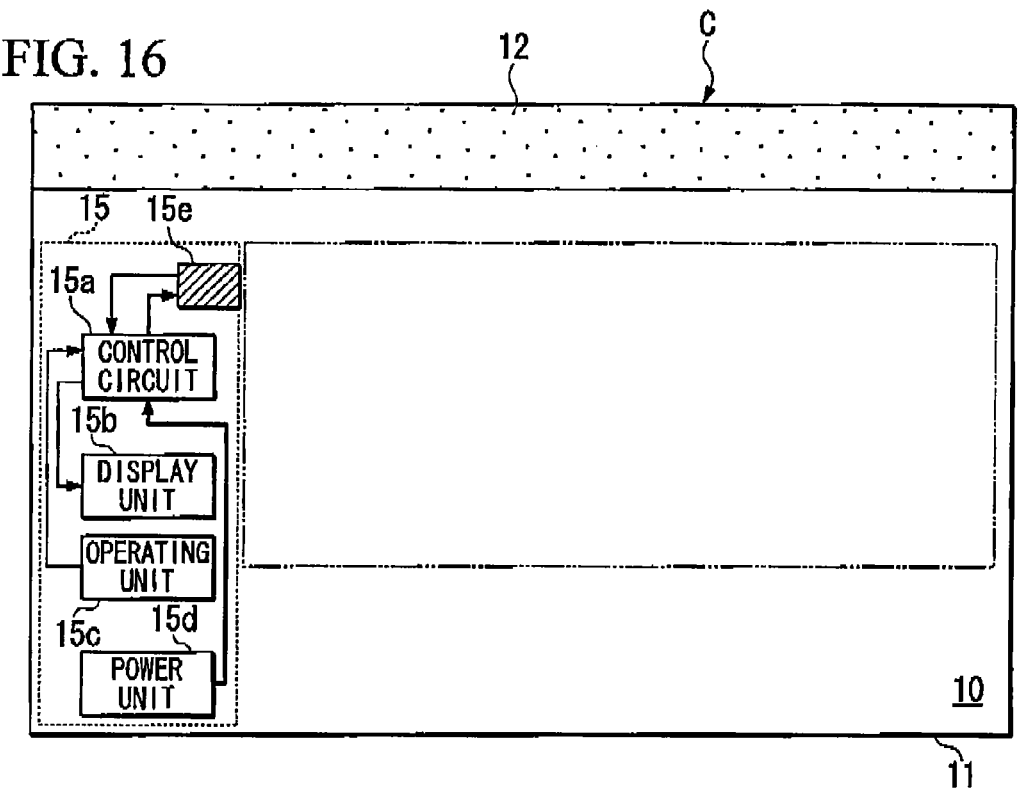
FIG. 16 is a schematic view illustrating the temperature control apparatus in which the temperature regulation board of FIGS. 15A and 15B is not mounted.
Figure 17:
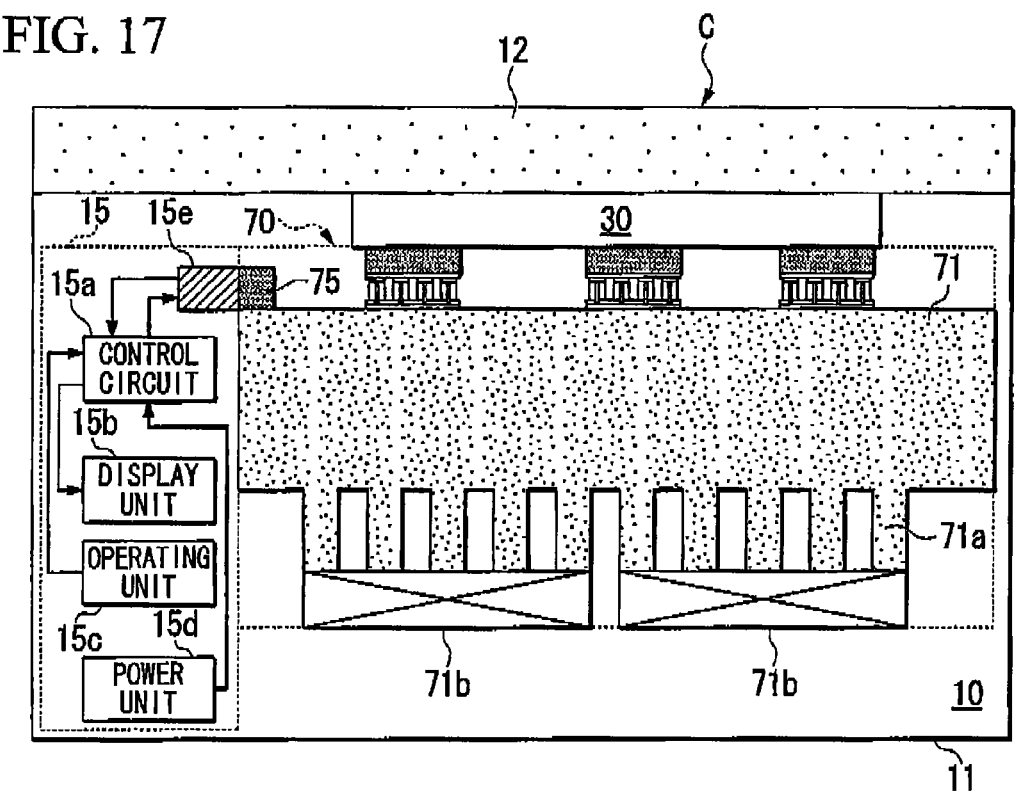
FIG. 17 is a schematic view illustrating the temperature control apparatus in which the temperature regulation board of FIGS. 15A and 15B with the microchemical chip is mounted.

Still another temperature control apparatus for a microchemical chip will be described. FIG. 15A is a plan view illustrating a temperature regulation board to be used in the temperature control apparatus in accordance with a third embodiment of the present invention. FIG. 15B is a fragmentary cross sectional elevation view illustrating the temperature regulation board of FIG. 15A. FIG. 16 is a schematic view illustrating the temperature control apparatus in which the temperature regulation board of FIGS. 15A and 15B is not mounted. FIG. 17 is a schematic view illustrating the temperature control apparatus in which the temperature regulation board of FIGS. 15A and 15B with the microchemical chip is mounted. The following descriptions will be highlighted to differences of the third embodiment from the above-described first embodiment.

In accordance with the above-described first embodiment of the present invention, the board 21 is mounted on the mounting stage 13 having the plurality of radiator fins 13a that perform as the heat sink. A temperature regulation board 70 includes the board 21 that is discrete from the mounting stage 13 performing as the heat sink.

In accordance with the third embodiment of the present invention, the board of the temperature regulation board is configured to allow a plurality of thermoelectric modules to be mounted thereon The board of the temperature regulation board is also configured to perform as a heat sink. The board can advantageously include, but is not limited to, a plurality of radiator fins. The board may advantageously be greater in thickness than that of the board 21 of the above-described first embodiment of the present invention. The board of the temperature regulation board is also configured to integrate at least one electric fan that is adjacent to the plurality of radiator fins. The board of the temperature regulation board of this third embodiment performs as a mounting board for mounting the plurality of thermoelectric modules thereon. The board also performs as a heat sink for radiating a heat. The board also integrates at least one electric fan. This integration design can improve the heat exhaust efficiency thereby improving the accuracy in temperature regulation.

As shown in FIGS. 16 and 17, a temperature control apparatus "C" for a microchemical chip may include, but is not limited to, a body 10 that is contained in a casing 11. The casing 11 is covered by a cover member 12. The body 10 may include, but is not limited to, a control unit 15, and a temperature regulation board 70. The temperature regulation board 70 may further include, but is not limited to, a board 71, at least one electric fan 71b, at least one thermoelectric module 73, and at least one heat conductor 74, and a first connector 75. The temperature regulation board 70 may advantageously include a plurality of thermoelectric modules 73. The control unit 15 is configured to control the plurality of thermoelectric modules 73 of the temperature regulation board 70.

As shown in FIG. 17, the microchemical chip 30 can advantageously be placed on the temperature regulation board 70 so that the microchemical chip 30 is adjacent to or contacts with the heat conductors 74 that are provided on the thermoelectric modules 73. The microchemical chip 30 may include one or more chemical reactors. The microchemical chip 30 may include, but is not limited to, first, second and third chemical reactors 32, 33, and 34 and channels 35 shown in FIG. 12, for example. The temperature regulation board 70 is configured to regulate a temperature of each of the chemical reactors of the microchemical chip 30.

The board 71 has first and second surfaces opposing to each other. A plurality of thermoelectric modules 73 can advantageously be placed on the first surface of the board 71. The plurality of thermoelectric modules 73 can advantageously be distanced from each other. The heat conductor 74 is placed on each of the plurality of thermoelectric modules 73. The fist connector 75 can advantageously be placed on the second surface of the board 71.

Further, the board 71 can advantageously be configured to perform as a heat sink. The board 71 has the second surface that has a plurality of radiator fins 71a. The plurality of radiator fins 71a extends downwardly from the second surface of the board 61. Furthermore, the board 71 can advantageously be configured to integrate the plurality of electric fan 71b directly under the plurality of radiator fins 71a so that the plurality of electric fan 71b faces toward, but is in contact with, the plurality of radiator fins 71a. The plurality of electric fan 71b is configured to cool the plurality of radiator fins 71a. The board 71 can advantageously be made of a material that has heat conductivity. A typical example of the material for the board 71 may include, but is not limited to, aluminum and aluminum alloys.

The cover member 12 covers the casing 11. The cover member 12 can advantageously perform as a pressing member that presses the microchemical chip 30 downwardly. The cover member 12 can advantageously be configured to push downwardly the microchemical chip 30 that is mounted on the temperature regulation board 70 so that the microchemical chip 30 is thermally engaged with the temperature regulation board 70. The microchemical chip 30 can advantageously contact with the temperature regulation board 70.

The temperature regulation board 70 is configured to thermally engage the microchemical chip 30 with the plurality of thermoelectric modules 73. The cover member 12 can include, but is not limited to, a structure to apply a mechanical force to the microchemical chip 30 downwardly. Typical examples of the mechanical force applying structure may include, but is not limited to, a spring mechanism, an elastic member. The cover member 12 may advantageously be made of, but not limited to, an elastic material.

A force-applying device can advantageously be used to apply a force to the microchemical chip 30 so that the microchemical chip 30 is forced to contact with the plurality of heat conductors 74 of the temperature regulation board 70. Typical examples of the force-applying device may include, but are not limited to, a pressing device and a suction device. The pressing device can be configured to be dedicated to press the microchemical chip 30 against the temperature regulation board 70 so that the microchemical chip 30 is forced to contact with the plurality of beat conductors 74 of the temperature regulation board 70. The pressing device can also be configured to cover the microchemical chip 30 and to press the microchemical chip 30 against the temperature regulation board 70 so that the microchemical chip 30 is forced to contact with the plurality of heat conductors 74 of the temperature regulation board 70. The suction device can be configured to suck the microchemical chip 30 so that the microchemical chip 30 is forced to contact with the plurality of heat conductors 74 of the temperature regulation board 70.

As shown in FIGS. 15A and 15B, the temperature regulation board 70 may further include, but is not limited to, the board 71, the plurality of electric fans 71b, a plurality of positioning guides 72, the plurality of thermoelectric modules 73, the plurality of heat conductors 74, the first connector 75, a first plurality of wirings 76, and a second plurality of wirings 77, and a plurality of attachment holes 78. The board 71 can advantageously be made of aluminum or an aluminum alloy. The plurality of positioning guides 72 are provided on the second surface of the board 71 so as to define a virtual area in which the plurality of thermoelectric modules 73 is provided. In a case, the plurality of thermoelectric modules 73 may include, but is not limited to, first, second and third thermoelectric modules 73a, 73b and 73c.

The plurality of positioning guides 72 can be modified, provided that the plurality of positioning guides 72 facilitates positioning the microchemical chip 30. In a case, the plurality of positioning guides 72 can advantageously be configured to be projected from the second surface of the board 71. In another case, the positioning guide can advantageously be configured to provide a depressing portion that receives or engages the microchemical chip 30. In another case, the positioning guide can advantageously be configured to provide a pair of markers on the board 71 and the microchemical chip 30 so that the microchemical chip 30 can be aligned to the board 71 with reference to the pair of markers.

Typically, the microchemical chip 30 may include, but is not limited to, a chip substrate 31 and first, second and third chemical reactors 32, 33, and 34 that are distanced from each other but are inter-connected through channels 35. The plurality of heat conductors 74 are provided on the plurality of thermoelectric modules 73. Each of the plurality of heat conductors 74 can advantageously be configured to transfer a heat from each of the plurality of thermoelectric modules 73 to at least one chemical reactor of the microchemical chip 30. The heat has been generated by each of the plurality of thermoelectric modules 73. The heat may be either warm or cold. The plurality of heat conductors 74 can be made of copper or aluminum.

The first plurality of wirings 76 are connected to the plurality of thermoelectric modules 73. For example, first, second and third wirings 76a, 76b and 76c are connected to the first, second and third thermoelectric modules 73a, 73b and 73c, respectively. The second plurality of wirings 77 are connected to the plurality of temperature sensors provided in the plurality of heat conductors 74 that are provided on the plurality of thermoelectric modules 73. For example, fourth, fifth and sixth wirings 77a, 77b and 67c are connected to the first, second and third temperature sensors provided in first, second and third heat conductors 74a, 74b and 74c that are provided on the first, second and third thermoelectric modules 73a, 73b and 73c, respectively.

The first connector 75 is connected through the first wiring 76a to the first thermoelectric module 73a. The first connector 75 is also connected through the fourth wiring 77a to the first temperature sensor provided in the first heat conductor 74a that is provided on the first thermoelectric module 73a. The first connector 75 is also connected through the second wiring 76b to the second thermoelectric module 73b. The first connector 75 is also connected through the fifth wiring 77b to the second temperature sensor provided in the second heat conductor 74b that is provided on the second thermoelectric module 73b. The first connector 75 is also connected through the third wiring 76c to the third thermoelectric module 73c. The first connector 75 is also connected through the sixth wiring 77c to the third temperature sensor provided in the third heat conductor 74c that is provided on the third thermoelectric module 73c.

The temperature regulation board 70 has four corners, each having the attachment hole 78 for attaching the temperature regulation board 70 to the body 10 of the temperature control apparatus.

As a modification, it is preferable to further attach heat sheets onto the plurality of heat conductors 74 so that the heat sheets provide a secured contact between the plurality of heat conductors 74 and the microchemical chip 30. It is also possible as a further modification to interpose grease between the plurality of heat conductors 74 and the microchemical chip 30, thereby reducing a heat resistance between the plurality of heat conductors 74 and the microchemical chip 30.

The plurality of thermoelectric modules 73 may advantageously be positioned corresponding to the plurality of chemical reactors of the microchemical chip 30. For example, the first, second and third thermoelectric modules 73 may be positioned corresponding to the first, second and third chemical reactors 32, 33 and 34, respectively.

As described above, the temperatures sensors are provided in the plurality of heat conductors 74. The temperature sensors are configured to measure temperatures of the plurality of thermoelectric modules 73 individually. For examples, the temperature sensors in the first, second and third heat conductors 74a, 74b, and 74c are configured to measure temperatures of the first, second and third thermoelectric modules 73a, 73b and 73c, respectively. The temperature sensor can be realized by, but not limited to, a thermister, a platinum resistance temperature sensor, and a thermocouple. The temperature sensors in the first, second, and third heat conductors 74a, 74b, and 74c are connected through the fourth, fifth, and sixth wirings 77a, 77b, and 77c to signal terminals of the first connector 75.

The first, second, and third thermoelectric modules 73a, 73b, and 73c are connected through the first, second, and third wirings 76a, 76b, and 76c to power terminals of the first connector 75. The first second, and third thermoelectric modules 73a, 73b, and 73c can be bonded to the board 71 by using an adhesive agent or a solder. A typical example of the adhesive agent may include, but is not limited to, a filler epoxy adhesive agent or a silicone-based adhesive agent.

As described above, the board 71 of the temperature regulation board 70 is configured to allow a plurality of thermoelectric modules 73 to be mounted hereon. The board 71 is also configured to perform as a heat sink. The board 71 may advantageously be greater in thickness than that of the board 21 of the above-described first embodiment of the present invention. The temperature regulation board 70 is further configured to integrate the plurality of radiator fins 71a and the plurality of electric fins 71b that are adjacent to the plurality of radiator fins 71a.

The board 71 of the temperature regulation board 70 performs both as a mounting board for mounting the plurality of thermoelectric modules 73 thereon and as a heat sink for radiating a heat. This integration design can improve the heat exhaust efficiency thereby improving the accuracy in temperature regulation. The integration design makes it easy to change the design of the plurality of radiator fins 71a and the plurality of electric fans 71b based on a desired quantity of exhaust heat, thereby improving the flexibility of the thermal design of the temperature control apparatus "C". The increase in dimensions of the radiator fins 71a increases the quantity of exhaust heat per unit area. The increase in density or the number of the radiator fins 71a increases the quantity of exhaust heat per unit area. The decrease in dimensions of the radiator fins 71a decreases the quantity of exhaust heat per unit area. The decrease in density or the number of the radiator fins 71a decreases the quantity of exhaust heat per unit area The increase in blowing performance of the plurality of electric fans 71b increases the quantity of exhaust heat. The decrease in blowing performance of the plurality of electric fans 71b decreases the quantity of exhaust heat.

Figure 18:
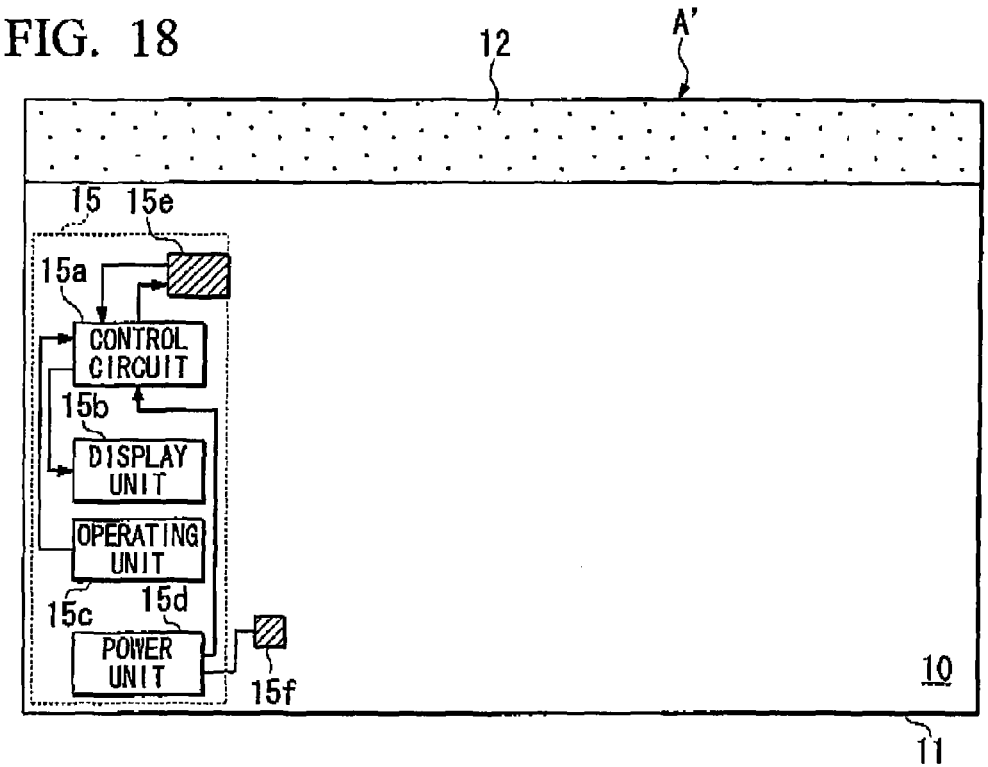
FIG. 18 is a schematic view illustrating a first modified empty body of the temperature control apparatus in accordance with the present invention.
Figure 19:
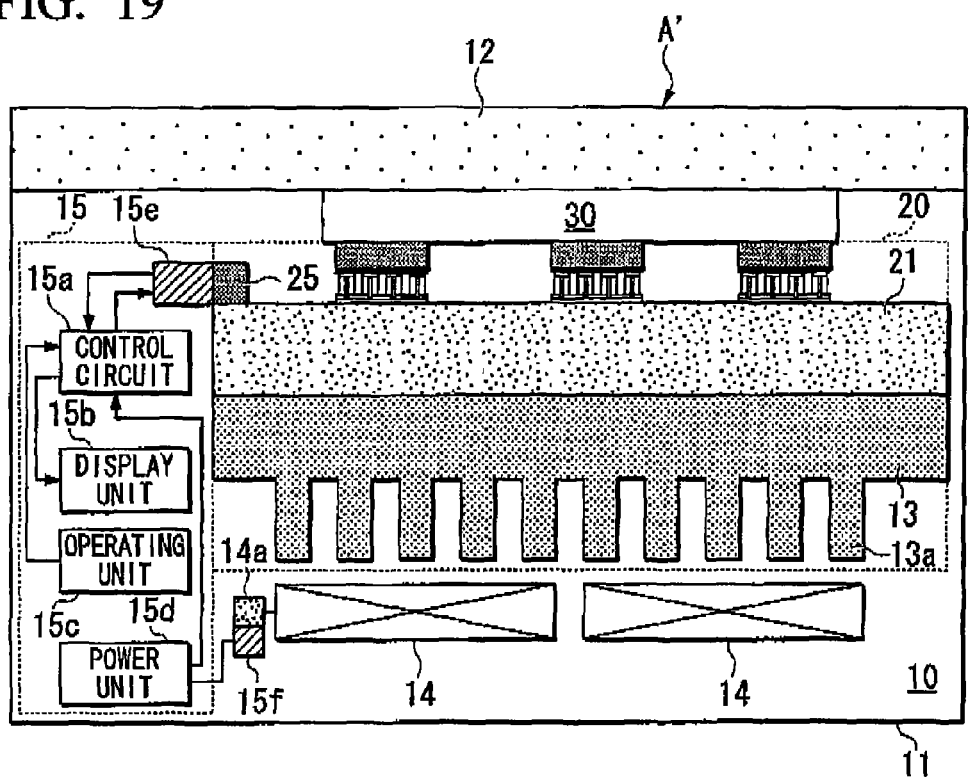
FIG. 19 is a schematic view illustrating a first modified temperature control apparatus in accordance with the present invention.

Modifications:

A first modified temperature control apparatus "A'" has a modified connector structure. FIG. 18 is a schematic view illustrating a first modified empty body of the temperature control apparatus. FIG. 19 is a schematic view illustrating a first modified temperature control apparatus. It is possible as a modification of the above-described fist embodiment to further provide third and fourth connectors 14a and 15f as shown in FIGS. 18 and 19. The third connector 14a is connected to the plurality of electric fans 14. The fourth connector 15f is connected to the power unit 15d. The third and fourth connectors 14a and 15f are connected to each other so that the plurality of electric fans 14 is electrically connected to the power unit 15d through the third and fourth connectors 14a and 15f. The fourth connector 15f can advantageously be included in the control unit 15 that is included in the body 10 of the first modified temperature control apparatus "A'". The third connector 14a is integrated in the plurality of electric fans 14. A set of the temperature regulation board 20 and the plurality of electric fins 14 is exchangeable by a simple operation of disconnection and connection between the first and second connectors 25 and 15e as well as between the third and fourth connectors 14a and 15f.

Figure 20:
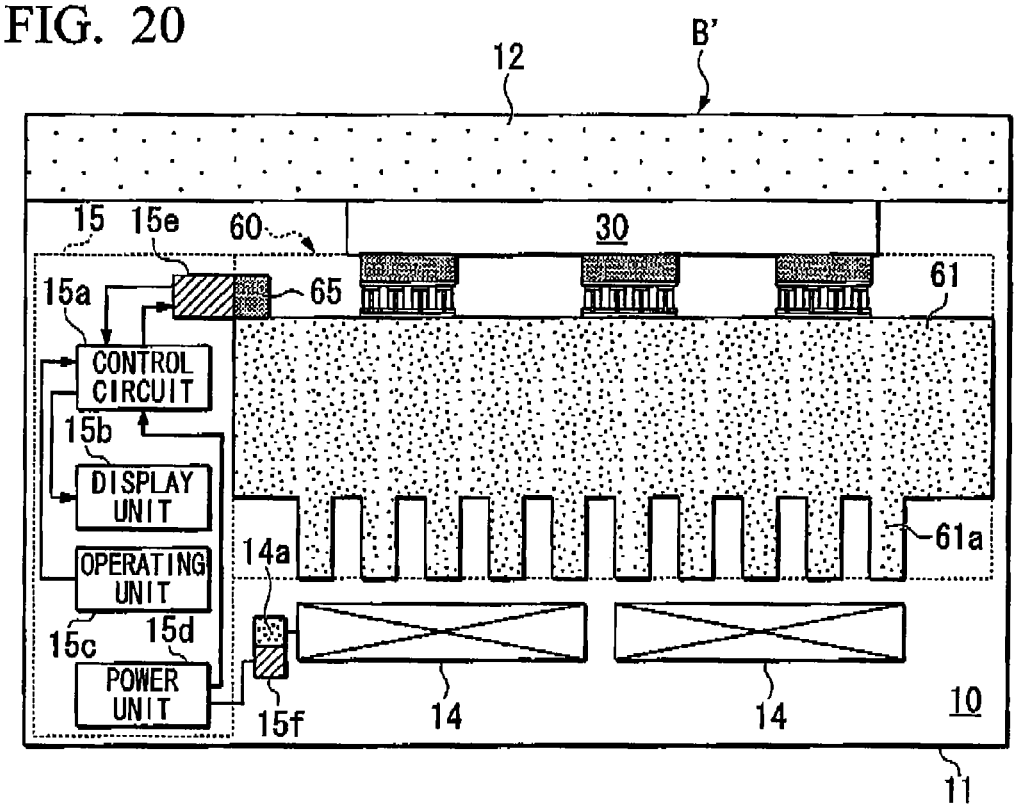
FIG. 20 is a schematic view illustrating a second modified temperature control apparatus in accordance with the present invention.

A second modified temperature control apparatus "B'" has a modified connector structure. FIG. 20 is a schematic view illustrating a second modified temperature control apparatus. It is possible as a modification to further provide third and fourth connectors 14a and 15f as shown in FIGS. 18 and 20. The third connector 14a is connected to the plurality of electric fans 14. The fourth connector 15f is connected to the power unit 15d. The third and fourth connectors 14a and 15f are connected to each other so that the plurality of electric fins 14 is electrically connected to the power unit 15d through the third and fourth connectors 14a and 15f. The fourth connector 15f can advantageously be included in the control unit 15 that is included in the body 10 of the temperature control apparatus "B'". The third connector 14a is integrated in the plurality of electric fans 14. A set of the temperature regulation board 60 and the plurality of electric fins 14 is exchangeable by a simple operation of disconnection and connection between the first and second connectors 65 and 15e as well as between the third and fourth connectors 14a and 15f.

Figure 21:
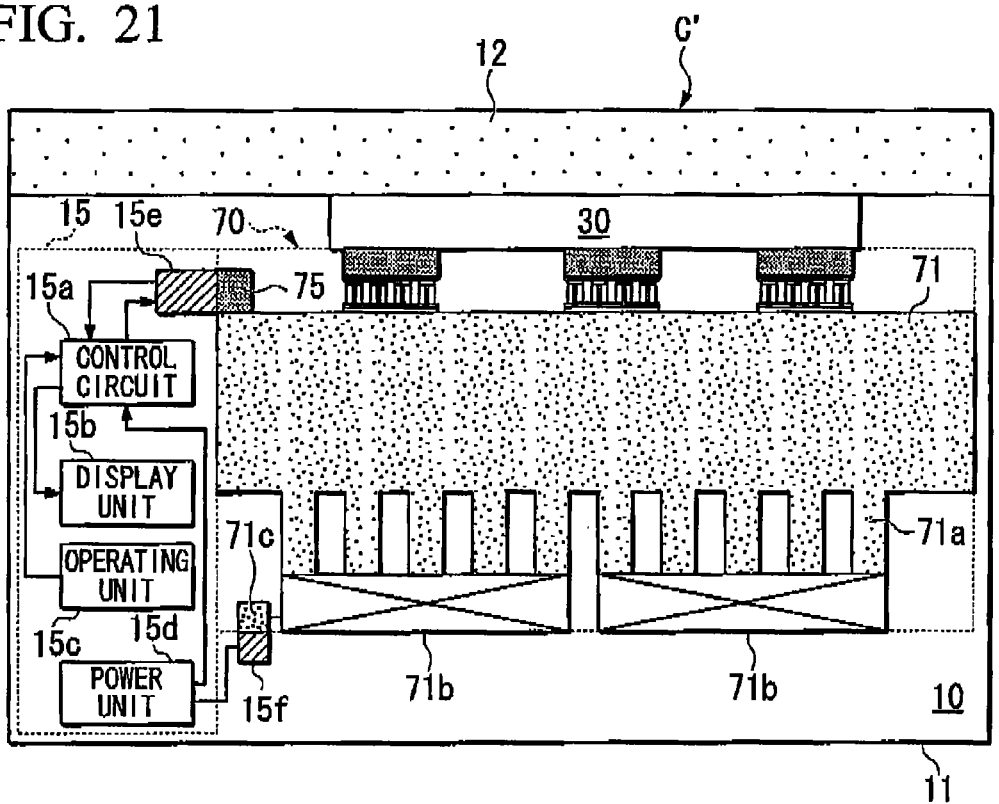
FIG. 21 is a schematic view illustrating a third modified temperature control apparatus in accordance with the present invention.

A third modified temperature control apparatus "C'" has a modified connector structure. FIG. 21 is a schematic view illustrating a third modified temperature control apparatus. It is possible as a modification to further provide third and fourth connectors 71c and 15f as shown in FIGS. 18 and 21. The third connector 71c is connected to the plurality of electric fans 71b. The fourth connector 15f is connected to the power unit 15d. The third and fourth connectors 71c and 15f are connected to each other so that the plurality of electric funs 71b is electrically connected to the power unit 15d through the third and fourth connectors 71c and 15f. The fourth connector 15f can advantageously be included in the control unit 15 that is included in the body 10 of the temperature control apparatus "C'". The third connector 71c is integrated in the plurality of electric fans 71b. A set of the temperature regulation board 70 and the plurality of electric fins 71b is exchangeable by a simple operation of disconnection and connection between the first and second connectors 75 and 15e as well as between the third and fourth connectors 71c and 15f.

Figure 22:
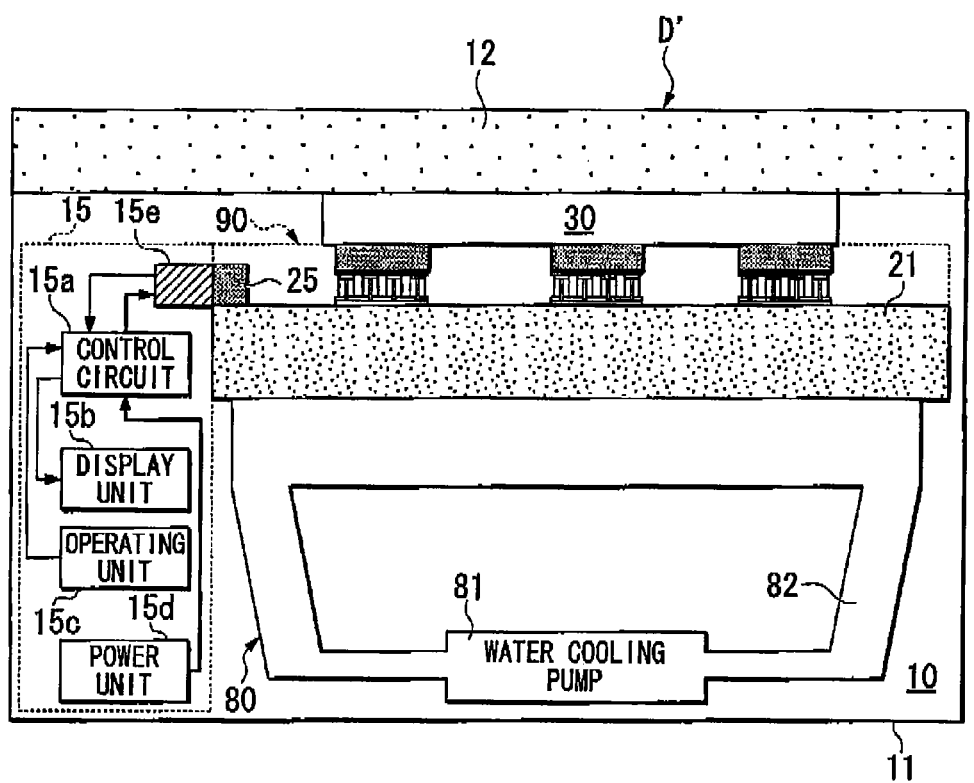
FIG. 22 is a schematic view illustrating a fourth modified temperature control apparatus in accordance with the present invention.

In accordance with the foregoing embodiments, the heat exhaustion is carried out by the radiator fins and the electric fans. It is possible as a modification to use a water cooling system instead of the radiator fins and the electric fans. FIG. 22 is a schematic view illustrating a fourth modified temperature control apparatus in accordance with the present invention. A fourth modified temperature control apparatus "D" for a microchemical chip may include, but is not limited to, a body 10 that is contained in a casing 11. The body 10 may include, but is not limited to, the control unit 15, a temperature regulation board 90, and a water cooling system 80. The temperature regulation board 90 may further include, but is not limited to, a board 21, at least one thermoelectric module 23, and at least one heat conductor 24, and a first connector 25. The temperature regulation board 90 may advantageously include a plurality of thermoelectric modules 23. The control unit 15 is configured to control the plurality of thermoelectric modules 23 of the temperature regulation board 90. The board 71 is free of radiator fin. No electric fan is provided.

The water cooling system 80 is provided for carrying out a heat exhaustion. The water cooling system 80 is disposed adjacent to the board 21. The water cooling system 80 may advantageously include, but is not limited to, a water cooling pump 81, and a water cooling pipe 82 that extends adjacent to the board 21 of the temperature regulation board 90.

In accordance with the foregoing embodiments, the cover member 12 is configured to cover the entirety of the microchemical chip 30. It is possible as a modification for the cover member 12 to be configured to cover partially the microchemical chip 30 so as to allow a pump to be provided to the microchemical chip.

In accordance with the foregoing embodiments, the board of the temperature regulation board can be made of aluminum or an aluminum alloy because aluminum or an aluminum alloy has high heat conductivity and is lightweight. Other typical examples of the material for the board of the temperature regulation board may advantageously include, but are not limited to, copper, copper alloys, and ceramics such as alumina and aluminum nitride. Heat conductive materials are available for the board of the temperature regulation board.

Fourth Embodiment

In accordance with the above-described first to third embodiments and those modifications, the cover member 12 is configured to cover the casing 11 and also to press the microchemical chip 30 (30a, 30b, 30c) that is mounted on the temperature regulation board 20 (40, 50, 60, 70) so that the microchemical chip 30 (30a, 30b, 30c) securely contacts with the heat conductors 24 (64, 74) that are provided on the thermoelectric modules 23 (63, 73).

Considering the thermal efficiency, it is preferable for the cover member 12 to be configured to press local areas of the microchemical chip 30 (30a, 30b, 30c), wherein the local areas include the chemical reactors (32, 33, 34), and the local areas are positioned corresponding to the thermoelectric modules 23 (63, 73).

Figure 23A:
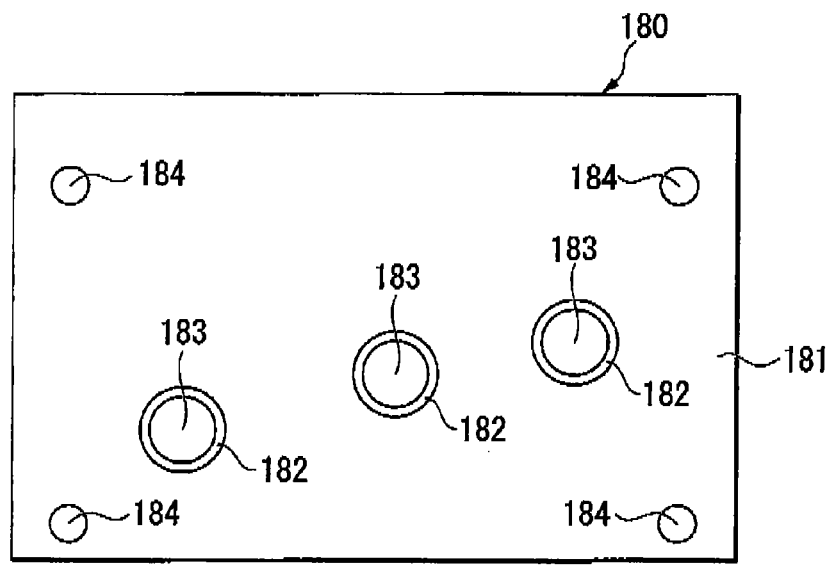
FIG. 23A is a plan view illustrating a pressing member that is provided on the cover member of the temperature control apparatus in accordance with a fourth embodiment of the present invention.
Figure 23B:
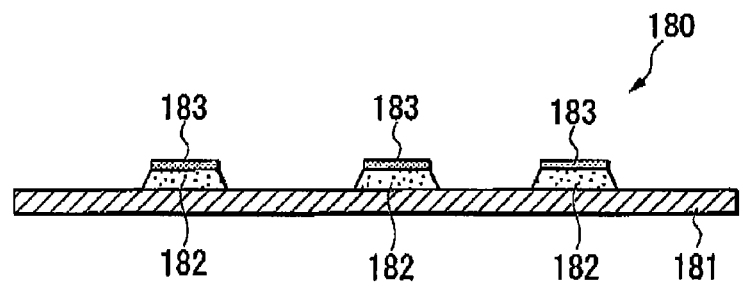
FIG. 23B is a fragmentary cross sectional elevation view illustrating the pressing member of FIG. 23A.
Figure 24:
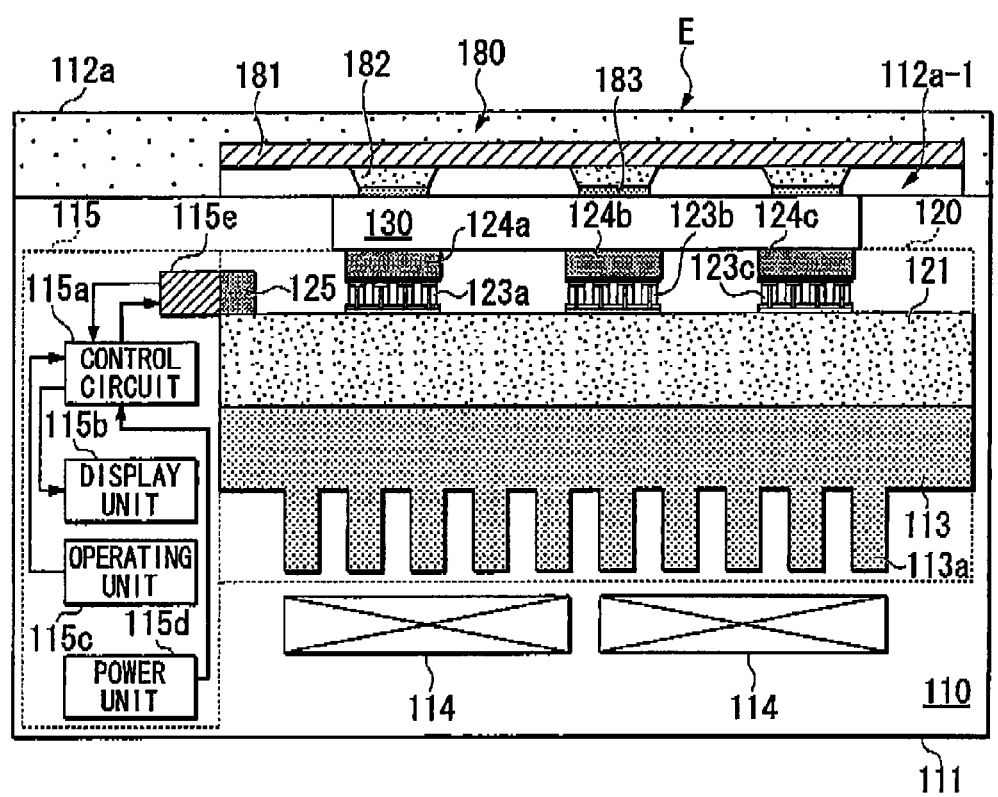
FIG. 24 is a schematic view illustrating a temperature control apparatus including the cover member having the pressing member shown in FIGS. 23A and 23B in accordance with the fourth embodiment of the present invention.

FIG. 23A is a plan view illustrating a pressing member that is provided on the cover member of the temperature control apparatus in accordance with a fourth embodiment of the present invention. FIG. 23B is a fragmentary cross sectional elevation view illustrating the pressing member of FIG. 23A. FIG. 24 is a schematic view illustrating a temperature control apparatus including the cover member having the pressing member shown in FIGS. 23A and 23B in accordance with the fourth embodiment of the present invention. The following descriptions will be highlighted to differences of the fourth embodiment from the above-described first to third embodiments.

The temperature control apparatus "E" shown in FIG. 24 is different in the cover member 112a from the temperature control apparatus "A" shown in FIG. 2. The following descriptions will focus on the difference of the temperature control apparatus "E" from the temperature control apparatus "A".

The temperature control apparatus "E" has a cover member 112a that is configured to cover a casing 111 and also to press local areas of a microchemical chip 130, wherein the local areas include chemical reactors, and the local areas are positioned corresponding to thermoelectric modules 123. The cover member 112a includes a pressing member 180 that is configured to press local areas of a microchemical chip 130. As shown in FIG. 24, the cover member 112a has a recess 112a-1 that contains the pressing member 180. In a case, the pressing member 180 can advantageously be fixed to the cover member 112a. As shown in FIGS. 23A and 23B, the pressing member 180 includes a body 181, a plurality of projections 82 disposed on the body 181, and a plurality of contact members 183 disposed on the plurality of projections 182. The body 181 further has a plurality of holes 184 that allow fixing screws to penetrate the plurality of holes 184 thereby fixing the body 181 to the cover member 180. The plurality of contact members 183 can advantageously be made of an elastic material. A typical example of the elastic material may include, but is not limited to, a silicone rubber. Removable attachment of The pressing member 180 to the cover member 112a permits exchanging a type of the pressing member 180 into another type of the pressing member 180.

The body 181 can advantageously be realized by a rigid plate. A typical example of the rigid plate may include, but is not limited to, a metal plate. The plurality of projections 182 can advantageously be shaped in truncated cone. The plurality of projections 182 can advantageously be made of a material having a low thermal conductivity. Typical examples of the material of the plurality of projections 182 may include, but is not limited to, urethane foams, nitrile rubbers, and glasses. The plurality of contact members 183 can advantageously be shaped in disk or cylinder. The plurality of contact members 183 can advantageously be fixed to the tops of the plurality of projections 182 by using an adhesive agent. The plurality of projections 182 can advantageously be positioned relative to the body 181 so that the plurality of projections 182 is aligned in plan view to the chemical reactors 132, 133, and 134 and also to the thermoelectric modules 123a, 123b, and 123c, thereby allowing the plurality of projections 182 to press the chemical reactors 132, 133, and 134 and also to press the thermoelectric modules 123a, 123b, and 123c.

It is possible as a modification for the cover member 112a to have a weight that increases the total weight of the cover member 112a. The weight can advantageously be realized by a metal plate. The weight can advantageously be interposed between the cover member 112a and the pressing member 180.

The pressing member 180 is placed in the recess 112a-1 of the cover member 112a. The pressing member 180 is positioned relative to the cover member 112a. The cover member 112a is placed over the casing 111 to cover the casing 111, while the plurality of contact members 183 on the plurality of projections 182 presses the chemical reactors 132, 133, and 134 so that the chemical reactors 132, 133, and 134 make contact with the heat conductors 124a, 124b and 124c, whereby the chemical reactors 132, 133 and 134 are thermally engaged with the thermoelectric modules 123a, 123b and 123c through the heat conductors 124a, 124b and 124c.

The plurality of contact members 183 made of an elastic material such as a silicone rubber can press the chemical reactors 132, 133, and 134 without providing any substantive damage to the microchemical chip 130. Using the elastic material for the plurality of contact members 183 can prevent any substantive deviation of the level or height of the microchemical chip 130 from the target level. The cover member 112a allows a highly accurate temperature control of the chemical reactors 132, 133, and 134.

A force-applying device can advantageously be used to apply a force to the microchemical chip 130 so that the microchemical chip 130 is forced to contact with the plurality of heat conductors 124 of the temperature regulation board 120. Typical examples of the force-applying device may include, but are not limited to, a pressing device and a suction device. The pressing device can be configured to be dedicated to press the microchemical chip 130 against the temperature regulation board 120 so that the microchemical chip 130 is forced to contact with he plurality of heat conductors 124 of the temperature regulation board 120. The pressing device can also be configured to cover the microchemical chip 130 and to press the microchemical chip 130 against the temperature regulation board 120 so that the microchemical chip 130 is forced to contact with the plurality of heat conductors 124 of the temperature regulation board 120. The suction device can be configured to suck the microchemical chip 130 so that the microchemical chip 130 is forced to contact with the plurality of heat conductors 124 of the temperature regulation board 120.

Fifth Embodiment

In accordance with the above-described first to fourth embodiments and those modifications, the temperature regulation board 20 (40, 60, 70, 90) including the thermoelectric modules 23 (63, 73) is placed under the microchemical chip 30. The microchemical chip 30 is disposed on the temperature regulation board 20 (40, 60, 70, 90). The cover member 12 is disposed over the microchemical chip 30. The microchemical chip 30 is thermally engaged with the temperature regulation board 20 (40, 60, 70, 90) that is placed under the microchemical chip 30. This means that the single-side temperature control to the microchemical chip 30 is performed.

It is possible as modifications to perform both-sides temperature controls to the microchemical chip 30 are performed. The both-sides temperature controls may be first and second temperature controls in first and second sides opposing each other of the microchemical chip 30. The first and second temperature controls can advantageously be performed independently or in cooperation with each other. For example, first and second temperature regulation boards can advantageously be disposed over and under the microchemical chip 30, respectively.

Figure 25A:
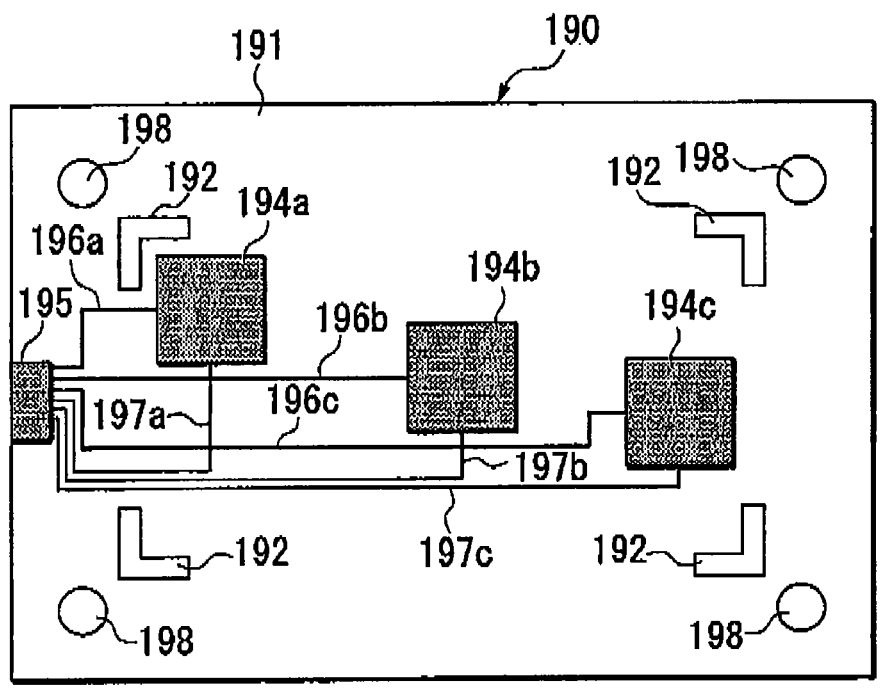
FIG. 25A is a plan view illustrating a second temperature regulation board that is disposed over a microchemical chip in accordance with a fifth embodiment of the present invention.
Figure 25B:
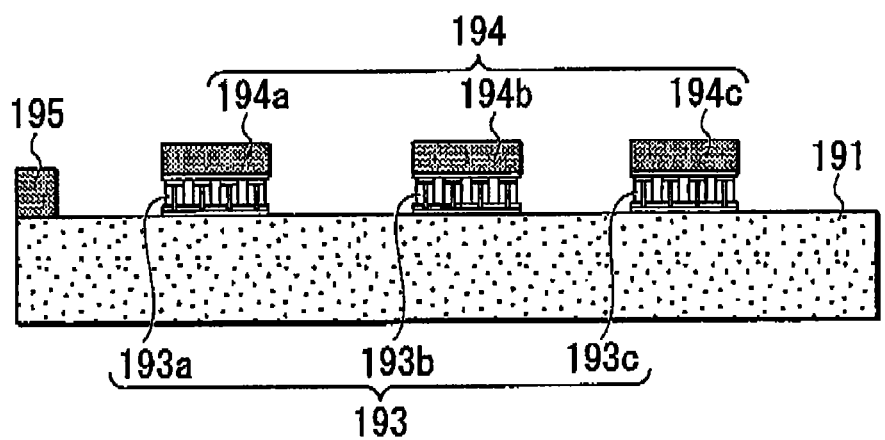
FIG. 25B is a cross sectional elevation view illustrating the second temperature regulation board of FIG. 25A.
Figure 26A:
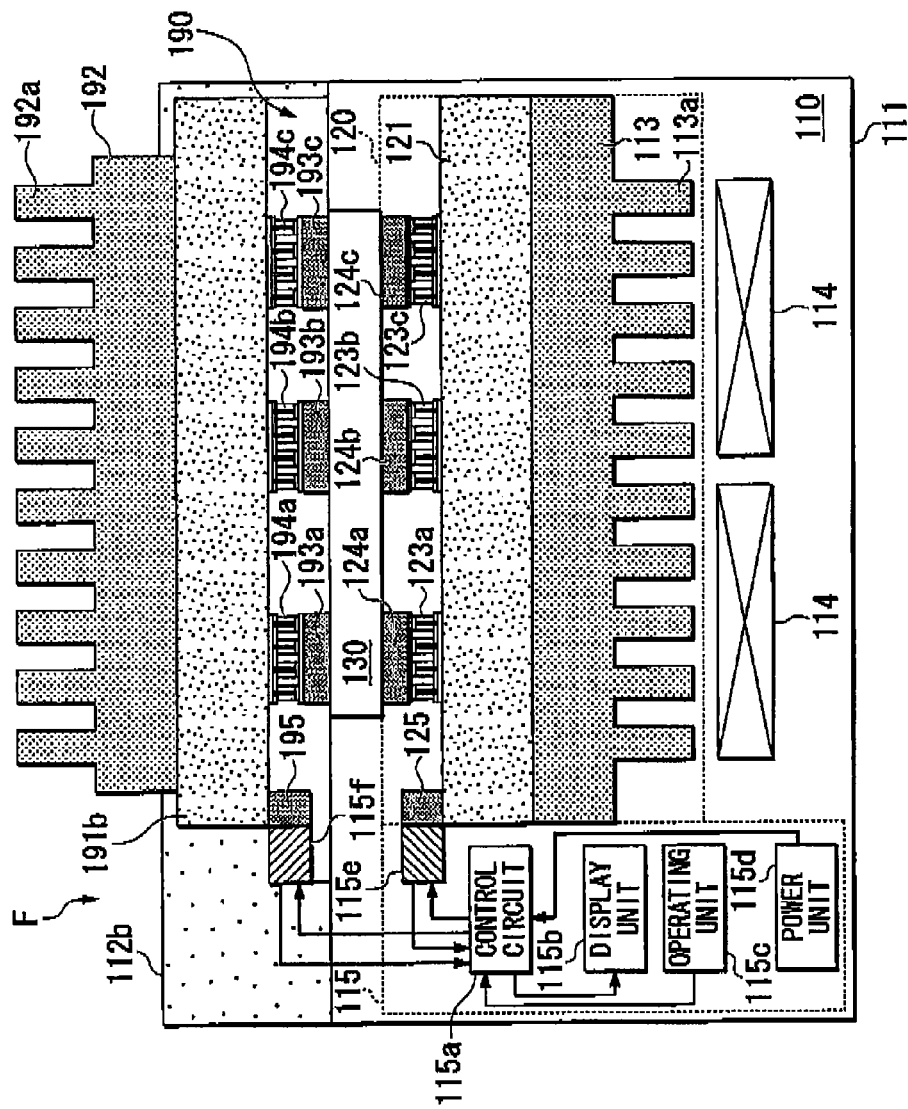
FIG. 26A is a schematic view illustrating a temperature control apparatus in accordance with the fifth embodiment of the present invention.
Figure 26B:
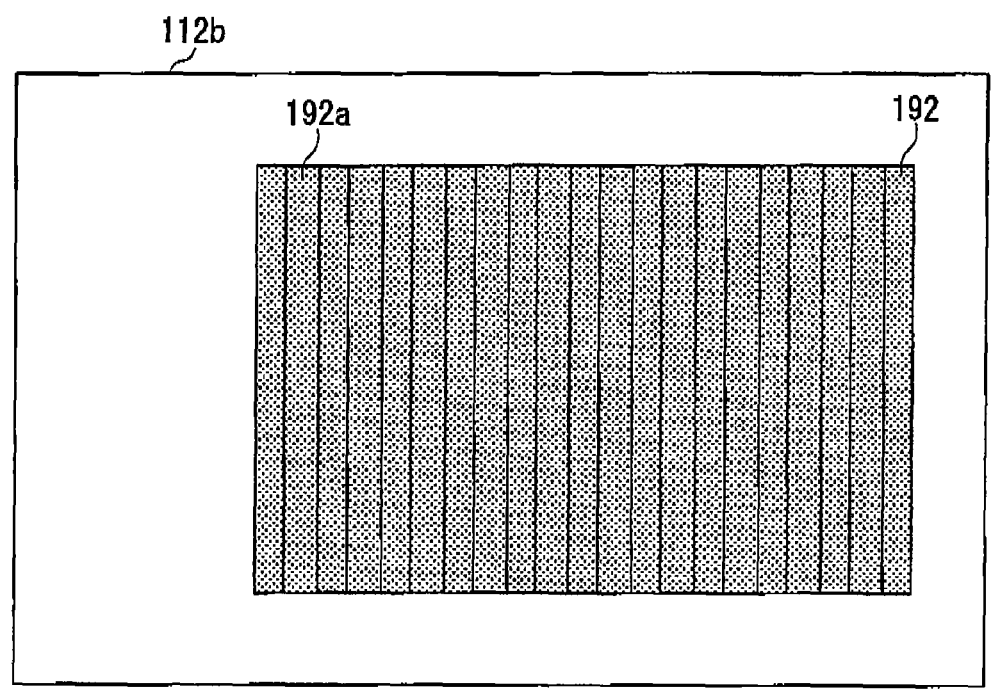
FIG. 26B is a plan view illustrating the temperature control apparatus of FIG. 26A.

FIG. 25A is a plan view illustrating a second temperature regulation board that is disposed over a microchemical chip in accordance with a fifth embodiment of the present invention. FIG. 25B is a cross sectional elevation view illustrating the second temperature regulation board of FIG. 25A. FIG. 26A is a schematic view illustrating a temperature control apparatus in accordance with the fifth embodiment of the present invention. FIG. 26B is a plan view illustrating the temperature control apparatus of FIG. 26A.

A temperature control apparatus "F" shown in FIG. 26 is different in a cover member 112b from the temperature control apparatus "A" shown in FIG. 2. The following descriptions will focus on the difference of the temperature control apparatus "F" from the temperature control apparatus "A".

The temperature control apparatus "F" includes a first temperature regulation board 120 that is disposed under a microchemical chip 130, and a second temperature regulation board 190 that is disposed over the microchemical chip 130. The first temperature regulation board 120 is the same as the temperature regulation board 120 shown in FIG. 2. The first temperature regulation board 120 is connected to a control unit 115 through connectors 125 and 115e. The first temperature regulation board 120 includes a plurality of thermoelectric modules 123a, 123b, and 123c and a plurality of heat conductors 124a, 124b and 124c. The plurality of heat conductors 124a, 124b and 124c are disposed on the plurality of thermoelectric modules 123a, 123b, and 123c, respectively. The plurality of heat conductors 124a, 124b and 124c contact with a bottom surface of the microchemical chip 130. The plurality of thermoelectric modules 123a, 123b, and 123c are thermally engaged with the microchemical chip 130 through the plurality of heat conductors 124a, 124b and 124c.

The temperature control apparatus "F" includes a cover member 112b that is configured to cover a casing 111. The casing 111 contains the control unit 115, the first temperature regulation board 120, and the microchemical chip 130 disposed on the first temperature regulation board 120. The cover member 112b can also be configured to include the second temperature regulation board 190 that is thermally engaged with the microchemical chip 130. The second temperature regulation board 190 can advantageously be configured to contact with or to be adjacent to a top surface of the microchemical chip 130. For example, the cover member 112b can advantageously be configured to contain the second temperature regulation board 190.

The second temperature regulation board 190 is connected to the control unit 115 through connectors 195 and 115f. The second temperature regulation board 190 includes a plurality of thermoelectric modules 193a, 193b, and 193c and a plurality of beat conductors 194a, 194b and 194c. The plurality of heat conductors 194a, 194b and 194c are disposed on the plurality of thermoelectric modules 193a, 193b, and 193c, respectively. The plurality of heat conductors 194a, 194b and 194c contact with a top surface of the microchemical chip 130. The plurality of thermoelectric modules 193a, 193b, and 193c are thermally engaged with the microchemical chip 130 through the plurality of heat conductors 194a, 194b and 194c. The plurality of heat conductors 194a, 194b and 194c can advantageously be made of copper or aluminum.

The first temperature regulation board 120 may further include, but is not limited to, the first board 121, a plurality of first positioning guides 122, the plurality of first thermoelectric modules 123, the plurality of first heat conductors 124, the first connector 125, a first plurality of wirings 126, and a second plurality of wirings 127, and a plurality of attachment holes 128. The first board 121 can advantageously be made of aluminum or an aluminum alloy. The plurality of first positioning guides 122 are provided on the second surface of the first board 121 so as to define a virtual area in which the plurality of first thermoelectric modules 123 is provided. In a case, the plurality of first thermoelectric modules 123 may include, but is not limited to, thermoelectric modules 123a, 123b and 123c.

The plurality of first positioning guides 122 can be modified, provided that the plurality of first positioning guides 122 facilitates positioning the microchemical chip 130. In a case, the plurality of first positioning guides 122 can advantageously be configured to be projected from the top surface of the first board 121.

The second temperature regulation board 190 may further include, but is not limited to, the second board 191, a plurality of second positioning guides 192, the plurality of second thermoelectric modules 193, the plurality of second heat conductors 194, the second connector 195, a third plurality of wirings 196, and a fourth plurality of wirings 197, and a plurality of second attachment holes 198. The first board 121 can advantageously be made of aluminum or an aluminum alloy. The plurality of second positioning guides 192 are provided on the second surface of the second board 191 so as to define a virtual area in which the plurality of second thermoelectric modules 193 is provided. In a case, the plurality of second thermoelectric modules 193 may include, but is not limited to, thermoelectric modules 193a, 193b and 193c.

The plurality of second positioning guides 192 can be modified, provided that the plurality of second positioning guides 192 facilitates positioning the microchemical chip 130. In a case, the plurality of second positioning guides 192 can advantageously be configured to be projected from the bottom surface of the second board 121.

The third plurality of wirings 196 are connected to the plurality of second thermoelectric modules 193. The fourth plurality of wirings 197 are connected to the plurality of second temperature sensors provided in the plurality of second heat conductors 194 that are provided on the plurality of second thermoelectric modules 193.

The fifth connector 195 is connected through the wiring 196a to the thermoelectric module 193a. The fifth connector 195 is also connected through the wiring 127a to the temperature sensor provided in the heat conductor 194a that is provided on the thermoelectric module 193a. The connector 195 is also connected through the wiring 196b to the thermoelectric module 193b. The connector 195 is also connected through the wiring 197b to the temperature sensor provided in the heat conductor 194b that is provided on the thermoelectric module 193b. The fifth connector 195 is also connected through the wiring 196c to the third thermoelectric module 193c. The fifth connector 195 is also connected through the wiring 197c to the temperature sensor provided in the heat conductor 194c that is provided on the thermoelectric module 193c.

The second temperature regulation board 190 has four corners, each having the attachment hole 198 for attaching the second temperature regulation board 190 to the body 110 of the temperature control apparatus "F".

As a modification, it is preferable to further attach heat sheets onto the plurality of heat conductors 194 so that the heat sheets provide a secured contact between the plurality of heat conductors 194 and the microchemical chip 130. It is also possible as a further modification to interpose grease between the plurality of heat conductors 194 and the microchemical chip 130, thereby reducing a heat resistance between the plurality of heat conductors 194 and the microchemical chip 130.

The plurality of second thermoelectric modules 193 may advantageously be positioned corresponding to the plurality of chemical reactors of the microchemical chip 130. For example, the thermoelectric modules 193a, 193b and 193c may be positioned corresponding to the chemical reactors, respectively.

The temperatures sensors are provided in the plurality of second heat conductors 194. The temperature sensors are configured to measure temperatures of the plurality of thermoelectric modules 193 individually. For examples, the temperature sensors in the heat conductors 194a, 194b, and 194c are configured to measure temperatures of the thermoelectric modules 193a, 193b and 193c, respectively. The temperature sensor can be realized by, but not limited to, a thermister, a platinum resistance temperature sensor, and a thermocouple. The temperature sensors in the heat conductors 194a, 194b, and 194c are connected through the wirings 197a, 197b, and 197c to signal terminals of the connector 195.

The thermoelectric modules 193a, 193b, and 193c are connected through the wirings 196a, 196b, and 196c to power terminals of the connector 195. The thermoelectric modules 193a, 193b, and 193c can be bonded to the board 191 by using an adhesive agent or a solder. A typical example of the adhesive agent may include, but is not limited to, a filler epoxy adhesive agent, and a silicone-based adhesive agent.

The temperature regulation board 190 further includes a heat sink 192 that promotes heat exchange to the plurality of thermoelectric modules 193. The heat sink 192 can advantageously be disposed on an opposite surface of the board 191 to the surface on which the plurality of thermoelectric modules 193 is disposed. For example, the plurality of thermoelectric modules 193 is disposed on the bottom surface of the board 191, while the heat sink 192 is disposed on the top surface of the board 191.

The heat sink 192 can advantageously include, but is not limited to, a body and a plurality of radiator fins 92a that extend upwardly from the body. The heat sink 192 can removably be attached to the board 191 by using screws. Optionally, it is possible as a modification to provide one or more additional electric fans that are not illustrated.

The connector 125 is provided on the first temperature regulation board 120, while the connector 115f is provided on the control unit 115. The connector 195 is provided on the second temperature regulation board 190, wile the connector 115f is provided on the control unit 115. After the connector 125 is connected to the connector 115e, then the microchemical chip 130 is placed in the region defined by the positing guides 122. The connector 190 is connected to the connector 115f. The cover member 113b is placed over the casing 111 so that the second temperature regulation board 190 presses the microchemical chip 130, whereby the microchemical chip 130 is sandwiched between the first and second temperature regulation boards 120 and 190. Namely, the microchemical chip 130 is sandwiched between the plurality of first heat conductors 124a, 124b and 124c and the plurality of second beat conductors 194a, 194b and 194c.

The power unit 115d is operated to power-on. The operating unit 115c is operated to control or regulate a target temperature, based on which currents flow through the plurality of first thermoelectric modules 123a, 123b, and 123c and the plurality of second thermoelectric modules 193a, 193b, and 193c. The plurality of first thermoelectric modules 123a, 123b, and 123c and the plurality of second thermoelectric modules 193a, 193b, and 193c perform temperature controls, for example, heating up and cooling down the chemical reactors included in the microchemical chip 130 so that the temperatures of the chemical reactors included in the microchemical chip 130 are maintained at the target temperature set by the operating unit 115c. The microchemical chip 130 receives the both-side temperature controls by the first and second temperature regulation boards 120 and 190. Namely, the chemical reactors included in the microchemical chip 130 are subjected to both-side temperature controls by the plurality of first thermoelectric modules 123a, 123b, and 123c and the plurality of second thermoelectric modules 193a, 193b, and 193c. The both-side temperature controls can improve the accuracy of the temperature control.

A force-applying device can advantageously be used to apply a force to the microchemical chip 130 so that the microchemical chip 130 is forced to contact with the plurality of first heat conductors 124 of the first temperature regulation board 120 and also contact with the plurality of second heat conductors 194 of the second temperature regulation board 190. Typical examples of the force-applying device may include, but are not limited to, a pressing device and a suction device. The pressing device can be configured to be dedicated to press the microchemical chip 130 against the first temperature regulation board 120 and also to press the plurality of second heat conductors 194 of the second temperature regulation board 190 against the microchemical chip 130 so that the microchemical chip 130 is forced to contact with the plurality of first heat conductors 124 of the first temperature regulation board 120 and also contact with the plurality of second heat conductors 194 of the second temperature regulation board 190. The pressing device can also be configured to cover the microchemical chip 130 and to press the microchemical chip 130 against the first temperature regulation board 120 and also press the second temperature regulation board 190 against the microchemical chip 130 so that the microchemical chip 130 is forced to contact with the plurality of first heat conductors 124 of the first temperature regulation board 120 and also contact with the plurality of second heat conductors 194 of the second temperature regulation board 190. The suction device can be configured to suck the microchemical chip 130 so that the microchemical chip 130 is forced to contact with the plurality of first heat conductors 124 of the first temperature regulation board 120 and also contact with the plurality of second heat conductors 194 of the second temperature regulation board 190.

Sixth Embodiment

Figure 27:
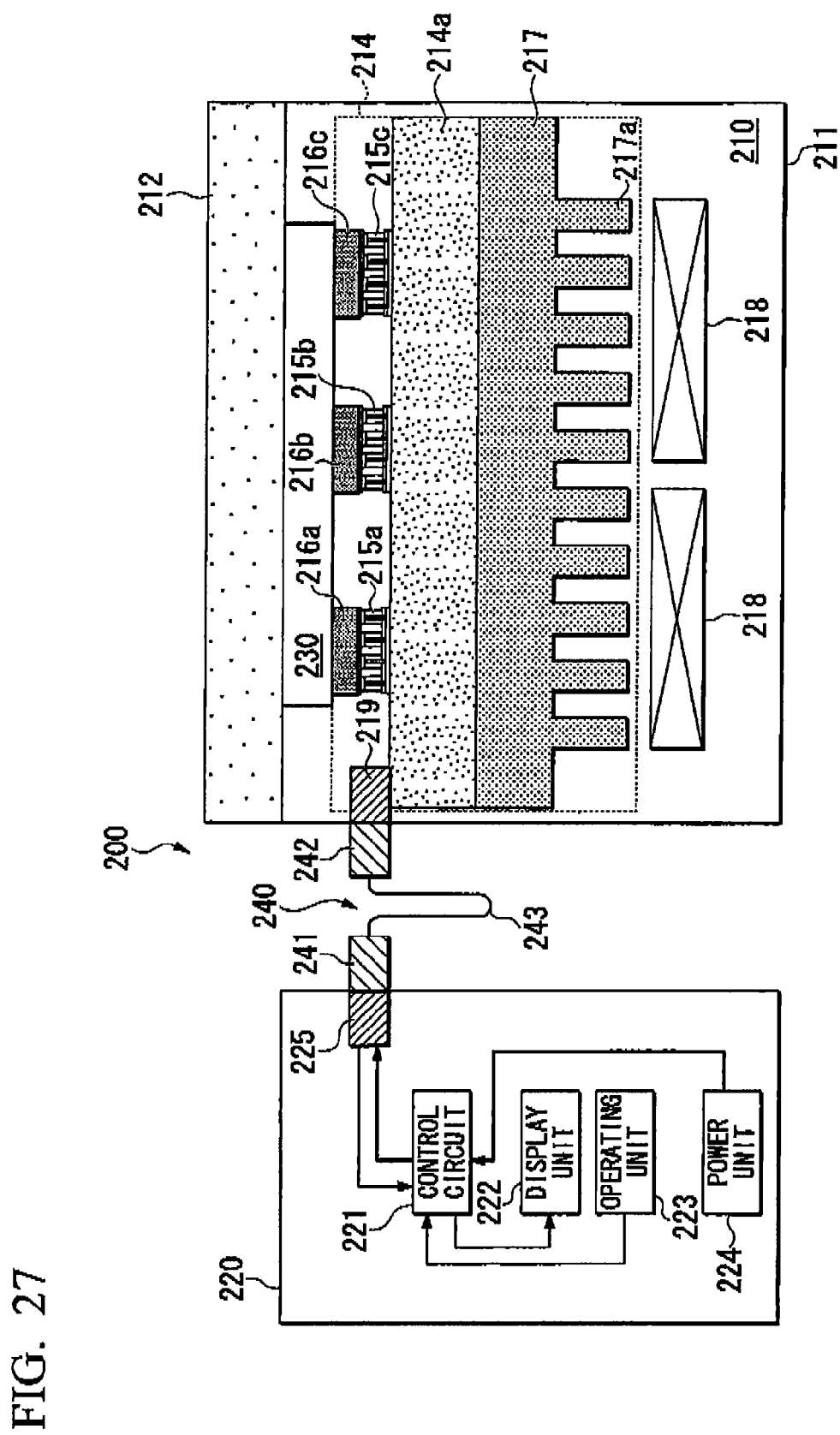
FIG. 27 is a schematic view illustrating a temperature control apparatus in accordance with the sixth embodiment of the present invention.

In accordance with the above-described first to fifth embodiments and those modifications, the single casing 11 (111) is configured to contain both the control unit 15 (115) and the body 10 including the temperature regulation board 20 (40, 50, 60, 70, 120). It is possible to provide separate first and second casings, for example, a first casing configured to contain the control unit 15 (115) and a second casing configured to contain the body 10 including the temperature regulation board 20 (40, 50, 60, 70, 120). Using the separate two casings is preferable in view of scaling down the control unit and the flexibility of the control unit FIG. 27 is a schematic view illustrating a temperature control apparatus in accordance with the sixth embodiment of the present invention. A temperature control apparatus 200 includes a body 210, a control unit 220 which is separated from the body 210, and a connecting device 240 that electrically connects the control unit 220 and the body 210. The body 210 is contained in a casing 211 that is covered by a cover member 212. The body 210 further includes a temperature regulation board 214, and electric fans 218. The temperature regulation board 214 is configured to allow a microchemical chip 230 to be mounted thereon. The cover member 212 is configured to cover the microchemical chip 230 and the temperature regulation board 214.

The temperature regulation board 214 further includes a mounting stage 217, a board 214a, a plurality of thermoelectric modules 215a, 215b and 215c, a plurality of heat conductors 216a, 216b and 216c. The plurality of thermoelectric modules 215a, 215b and 215c is disposed on a first surface of the board 214a. The plurality of heat conductors 216a, 216b and 216c is disposed on the plurality of thermoelectric modules 215a, 215b and 215c, respectively. The microchemical chip 230 is placed on the plurality of heat conductors 216a, 216b and 216c. The cover member 212 is placed over the microchemical chip 130. The cover member 212 presses the microchemical chip 130 downwardly and against the temperature regulation board 214 so that the microchemical chip 230 can tightly contact with the plurality of heat conductors 216a, 216b and 216c, whereby chemical reactors included in the microchemical chip 130 can be thermally engaged with the plurality of thermoelectric modules 215a, 215b and 215c.

A force-applying device can advantageously be used to apply a force to the microchemical chip 230 so that the microchemical chip 230 is forced to contact with the plurality of beat conductors 224 of the temperature regulation board 220. Typical examples of the force-applying device may include, but are not limited to, a pressing device and a suction device. The pressing device can be configured to be dedicated to press the microchemical chip 230 against the temperature regulation board 220 so that the microchemical chip 230 is forced to contact with the plurality of heat conductors 224 of the temperature regulation board 120. The pressing device can also be configured to cover the microchemical chip 230 and to press the microchemical chip 130 against the temperature regulation board 220 so that the microchemical chip 230 is forced to contact with the plurality of heat conductors 124 of the temperature regulation board 220. The suction device can be configured to suck the microchemical chip 230 so that the microchemical chip 230 is forced to contact with the plurality of heat conductors 224 of the temperature regulation board 220.

The board 214a is mounted on the mounting stage 217 so that a second surface of the board 214a contacts with a top surface of the mounting stage 217. The mounting stage 217 has a plurality of radiator fins 217a that extend downwardly and toward the electronic fans 218.

A connector 219 is disposed on the board 114a. The connector 219 is electrically connected to the plurality of thermoelectric modules 215a, 215b and 215c. The plurality of heat conductors 216a, 216b and 216c contain temperature sensors that are configured to sense the temperatures of the plurality of thermoelectric modules 215a, 215b and 215c.

The connector 219 is electrically connected to the temperature sensors contained in the plurality of heat conductors 216a, 216b and 216c.

The mounting stage 217 also performs as a heat sink. The mounting stage 217 can advantageously have a thermal conductivity. The mounting stage 217 can advantageously be made of aluminum and aluminum alloys. As described above, the mounting stage 217 has the plurality of radiator fins 217a to improve the heat radiation performance. Further, the electric fans 218 are provided under the plurality of radiator fins 217a to other improve the heat radiation performance.

As a modification, it is preferable to further attach heat sheets onto the plurality of heat conductors 216a, 216b and 216c so that the heat sheets provide a secured contact between the plurality of heat conductors 216a, 216b and 216c and the microchemical chip 230. It is also possible as a further modification to interpose grease between the plurality of heat conductors 216a, 216b and 216c and the microchemical chip 230, thereby reducing a heat resistance between the plurality of heat conductors 216a, 216b and 216c and the microchemical chip 230.

The plurality of thermoelectric modules 215a, 215b and 215c is positioned corresponding to the chemical reactors included in the microchemical chip 230. The plurality of heat conductors 216a, 216b and 216c contains a plurality of temperature sensors that are configured to sense the temperatures of the plurality of thermoelectric modules 215a, 215b and 215c, respectively. The temperature sensor can be realized by, but not limited to, a thermister, a platinum resistance temperature sensor, and a thermocouple. The plurality of temperature sensors is connected to signal terminals of the connector 219. The plurality of thermoelectric modules 215a, 215b and 215c is connected to power terminals of the connector 219.

The plurality of thermoelectric modules 215a, 215b and 215c can be bonded to the board 214a by using an adhesive agent or a solder. The plurality of heat conductors 216a, 216b and 216c can be bonded to the plurality of thermoelectric modules 215a, 215b and 215c by using an adhesive agent or a solder. A typical example of the adhesive agent may include, but is not limited to, a filler epoxy adhesive agent, and a silicone-based adhesive agent.

The control unit 220 may further include, but is not limited to, a control circuit 221, a display unit 222, an operating unit 223, a power unit 224, and a connector 225. The control circuit 220 can advantageously be configured to control the intensity and the direction of a current that flows through each of the plurality of thermoelectric modules 215a, 215b and 215c so that each of the plurality of thermoelectric modules 215a, 215b and 215c has the target temperature that has previously been set by the operating unit 223. The control by the control circuit 220 can be performed in accordance with a known feedback method. A typical example of the feedback method may include, but is not limited to, a PID control method. The PID control method has been well known to control temperature. The feedback method such as the PID control method can be realized by using the temperature sensor that is provided in each of the plurality of heat conductors 216a, 216b and 216c. For example, the control circuit 221 can advantageously be configured to control the intensity and the direction of the current with reference to output signals from the temperature sensors provided in the plurality of beat conductors 216a, 216b and 216c. The temperature sensors are not illustrated in the drawings. Preferably, the control circuit 221 can be configured to control the current thereby controlling a measured temperature in a set range of ±0.1° C. from the target temperature.

The display unit 222 can operatively be coupled to the control circuit 221 so as to display a measured temperature in real time and a set temperature. The operating unit 223 can advantageously be configured to set and change the target temperature of each of the plurality of thermoelectric modules 215a, 215b and 215c independently. The operating unit 223 has an interface to a user to allow the user to operate the operating unit 223. A typical example of the user interface may include, but is not limited to, one or more switches. The power unit 224 can advantageously be configured to convert a commercial alternating-current voltage into a direct-current voltage and supply the converted direct-current voltage to the control circuit 221. The control circuit 220 is connected to the connector 225.

The connecting device 240 can be configured to provide an electrical connection between the connectors 219 and 225. The connecting device 240 may include, but is not limited to, a connector 241, a connector 242 and a connecting cord 243 that connects between the connector 241 and connector 242. The connector 241 is configured to be electrically connected to the connector 225 of the control unit 220. The connector 242 is configured to be electrically connected to the connector 219 disposed on the board 214a. The plurality of thermoelectric modules 215a, 215b and 215c is electrically connected to the control unit 220 through the connecting device 240. The temperature sensors included in the plurality of heat conductors 216a, 216b and 216c is electrically connected to the control unit 220 through the connecting device 240.

The discrete configuration of the control unit 220 from the body 210 of the temperature control apparatus allows the control unit 220 to be scaled down and also increase flexibility of placements of the control unit 220 and the body 210 of the temperature control apparatus.

It is also possible as a modification that instead of the cover member, a pressing member or a pressing mechanism can be provided to press the microchemical chip against the temperature regulation board on which the microchemical chip is mounted, provided that the pressing member or the pressing mechanism can advantageously be dedicated to press the microchemical chip against the temperature regulation board on which the microchemical chip is mounted.

It is also possible as a modification that the temperature control apparatus is configured to be cooperated with an analyzer that is configured to analyze a product produced in the chemical reactor included in the microchemical chip. In a case, the temperature control apparatus can advantageously be coupled with the analyzer. In another case, the temperature control apparatus can advantageously be integrated in the analyzer. Namely, a system may include, but is not limited to, a temperature control apparatus containing a microchemical chip having at least a chemical reactor, and an analyzing apparatus for analyzing a product produced in the chemical reactor.

The terms of degree such as "substantially," "about," and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

The term "adjacent" means situated next to, close to, or contact with an object.

The term "thermally engage" means two objects are thermally coupled to each other so that a heat exchange between them can be obtained.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A temperature control apparatus for a microchemical chip having at least one chemical reactor, the temperature control apparatus comprising:
a first temperature regulator configured to allow the microchemical chip to be mounted thereon, the first temperature regulator configured to be thermally engaged with the at least one chemical reactor so as to control the temperature of the at least one chemical reactor; and
a controller configured to control the first temperature regulator, the first temperature regulator and the controller being removably connected to each other,
wherein the first temperature regulator further comprises a first connector, and the controller comprises a second connector, the first and second connectors being configured to be removably and electrically connected to each other, and the first and second connectors allow the first temperature regulator and the controller to be removable, and
wherein the first temperature regulator further comprises a first temperature control device disposed corresponding to each of the chemical reactors, the first temperature control device being configured to be adjacent to the microchemical chip, and the first temperature control device being electrically connected to the first connector.

2. The temperature control apparatus according to claim 1, further comprising:
a first heat conductor disposed on the first temperature control device, the first heat conductor being configured to be adjacent to the microchemical chip.

3. The temperature control apparatus according to claim 2, further comprising:
a first temperature sensor disposed in the first heat conductor, the first temperature sensor being configured to sense the temperature of the first temperature control device, and the first temperature sensor being electrically connected to the first connector.

4. The temperature control apparatus according to claim 1, wherein the first temperature regulator further comprises:
a supporter that has a thermal conductivity, the supporter being configured to allow the first temperature control device and the first connector to be disposed thereon.

5. The temperature control apparatus according to claim 4, wherein the supporter comprises a first heat radiator mechanism configured to perform heat radiation from the supporter.

6. The temperature control apparatus according to claim 5, wherein the first heat radiator mechanism comprises a first plurality of radiator fins.

7. The temperature control apparatus according to claim 6, wherein the supporter further comprises an integration of a board and the first plurality of radiator fins.

8. The temperature control apparatus according to claim 1, further comprising:
a cooling mechanism configured to cool the first temperature regulator.

9. The temperature control apparatus according to claim 8, wherein the cooling mechanism comprises an electric fan.

10. The temperature control apparatus according to claim 8, wherein the cooling mechanism comprises a water-cooling system.

11. The temperature control apparatus according to claim 1, further comprising:
a positioning guide configured to guide the positioning of the microchemical chip relative to the first temperature regulator.

12. The temperature control apparatus according to claim 1, further comprising:
a force-applying device configured to apply a force to the microchemical chip so that the microchemical chip makes contact with the first temperature regulator.

13. The temperature control apparatus according to claim 12, wherein the force-applying device comprises a pressing device configured to press the microchemical chip against the first temperature regulator so that the microchemical chip makes contact with the first temperature regulator.

14. The temperature control apparatus according to claim 13, wherein the pressing device comprises a cover member configured to cover the first temperature regulator, and the cover member is configured to make contact with the microchemical chip to press the microchemical chip against the first temperature regulator.

15. The temperature control apparatus according to claim 13, wherein the force-applying device comprises a suction device configured to suction the microchemical chip so that the microchemical chip makes contact with the first temperature regulator.

16. The temperature control apparatus according to claim 1, wherein the at least one chemical reactor is a plurality of chemical reactors, and the first temperature control device further comprises a plurality of thermoelectric modules that are disposed corresponding to the plurality of chemical reactors.

17. The temperature control apparatus according to claim 1, wherein the at least one chemical reactor comprises a plurality of chemical reactors, and the first temperature control device comprises at least one heater disposed corresponding to at least one of the plurality of chemical reactors, and at least one thermoelectric module disposed corresponding to the remainder of the plurality of chemical reactors.

18. The temperature control apparatus according to claim 1, wherein the controller further comprises a control circuit configured to apply a current to the first temperature regulator through the first and second connectors.

19. The temperature control apparatus according to claim 1, further comprising:
a cover member configured to cover the first temperature regulator, the cover member comprising a pressing member configured to press the microchemical chip against the first temperature control device so that the microchemical chip makes contact with the first temperature control device.

20. The temperature control apparatus according to claim 19, wherein the pressing member comprises a projecting member containing an elastic material, and the projecting member is provided on an inner wall of the cover member.

21. The temperature control apparatus according to claim 1, further comprising:
a casing that contains the first temperature regulator and the controller.

22. The temperature control apparatus according to claim 1, further comprising:
a first casing that contains the first temperature regulator, the first casing being separate from the controller.

23. A temperature control apparatus for a microchemical chip having at least one chemical reactor, the temperature control apparatus comprising:
- a first temperature regulator configured to allow the microchemical chip to be mounted thereon, the first temperature regulator configured to be thermally engaged with the at least one chemical reactor so as to control the temperature of the at least one chemical reactor;
- a controller configured to control the first temperature regulator, the first temperature regulator and the controller being removably connected to each other; and
- a cover member configured to cover the first temperature regulator, the cover member comprising a second temperature regulator adjacent to the microchemical chip, the second temperature regulator being configured to be thermally engaged with the at least one chemical reactor so as to control the temperature of the at least one chemical reactor in cooperation with the first temperature regulator, and the second temperature regulator being removably connected to the controller.

24. The temperature control apparatus according to claim 23, wherein the second temperature regulator comprises a third connector, and the controller further comprises a fourth connector, the third and fourth connectors being configured to be removably and electrically connected to each other.

25. The temperature control apparatus according to claim 24, wherein the second temperature regulator further comprises a second temperature control device disposed corresponding to each of the chemical reactors, the second temperature control device is configured to be adjacent to the microchemical chip, and the second temperature control device is electrically connected to the third connector.

26. The temperature control apparatus according to claim 25, further comprising:
- a second heat conductor disposed on the second temperature control device, the second heat conductor being configured to be adjacent to the microchemical chip.

27. The temperature control apparatus according to claim 25, further comprising:
- a second temperature sensor disposed in the second heat conductor, the second temperature sensor being configured to sense the temperature of the second temperature control device, and the second temperature sensor being electrically connected to the third connector.

28. The temperature control apparatus according to claim 27, wherein the cover member further comprises a second heat radiator mechanism configured to perform a heat radiation from the cover member.

29. The temperature control apparatus according to claim 28, wherein the second heat radiator mechanism comprises a second plurality of radiator fins.

30. The temperature control apparatus according to claim 23, further comprising:
- a second positioning guide configured to guide the positioning of the microchemical chip relative to the second temperature regulator.

31. A temperature control apparatus for a microchemical chip having at least one chemical reactor, the temperature control apparatus comprising:
- a temperature regulator configured to allow the microchemical chip to be mounted thereon, the temperature regulator configured to be thermally engaged with the at least one chemical reactor so as to control the temperature of the at least one chemical reactor, the temperature regulator further comprising a first connector and a plurality of temperature control devices, the temperature control devices being disposed corresponding to respective ones of the chemical reactors, each of the temperature control devices being configured to be adjacent to the microchemical chip;
- a controller configured to control the temperature regulator, the temperature regulator and the controller being removably connected to each other, the controller comprising a second connector;
- a plurality of heat conductors being each disposed on a corresponding one of the temperature control devices, each of the heat conductors being configured to be adjacent to the microchemical chip; and
- a plurality of temperature sensors being each disposed in a corresponding one of the first heat conductors,
- wherein each of the temperature control devices and the temperature sensors being electrically connected to the first connector via each wiring, and
- the first and second connectors allow the first temperature regulator and the controller to be removable.

* * * * *